(12) United States Patent
Kawabe

(10) Patent No.: US 7,012,641 B2
(45) Date of Patent: Mar. 14, 2006

(54) IMAGE SENSING APPARATUS, METHOD, MEMORY INVOLVING DIFFERENTIAL COMPRESSION OF DISPLAY REGION BASED ON ZOOM OPERATION OR SPEED

(75) Inventor: Takeshi Kawabe, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 953 days.

(21) Appl. No.: 09/781,255

(22) Filed: Feb. 13, 2001

(65) Prior Publication Data

US 2001/0013902 A1 Aug. 16, 2001

(30) Foreign Application Priority Data

Feb. 14, 2000  (JP) ........................................ 2000-035443
Feb. 14, 2000  (JP) ........................................ 2000-035444

(51) Int. Cl.
*H04N 5/262* (2006.01)

(52) U.S. Cl. .............................. 348/240.2; 348/333.03; 348/333.05; 348/350; 382/243

(58) Field of Classification Search ................ 348/353, 348/350, 348, 240.2, 333.01, 333.03, 333.05, 348/240.02
See application file for complete search history.

(56) References Cited

U.S. PATENT DOCUMENTS 5,619,265 A * 4/1997 Suzuki et al. ................ 348/362
5,699,113 A * 12/1997 Ohiwa ....................... 348/240.3
5,926,209 A * 7/1999 Glatt .......................... 348/143
5,933,187 A    8/1999 Hirasawa et al.
6,236,431 B1   5/2001 Hirasawa et al.
6,567,562 B1 * 5/2003 Nakayama et al. ......... 382/246

* cited by examiner

*Primary Examiner*—Thai Tran
*Assistant Examiner*—Gary C. Vieaux
(74) *Attorney, Agent, or Firm*—Fitzpatrick, Cella, Harper & Scinto

(57) ABSTRACT

The zoom speed of a zoom function is detected by a zoom lever detection circuit. A sensed image is displayed on a monitor, and a desired partial region in that sensed image is designated using a region designation lever. A compression circuit compresses the designated region and a non-designated region using different characteristics. A region detector controls the designated region on the basis of the detected zoom speed. In another arrangement, enlargement/reduction zoom operation by a zoom function is executed by a zoom lever. A sensed image is displayed on a monitor, and a desired partial region in that sensed image is designated using a region designation lever. A compression circuit compresses the designated region and a non-designated region using different characteristics. A region detector controls the designated region on the basis of the zoom operation.

38 Claims, 35 Drawing Sheets

FIG. 4
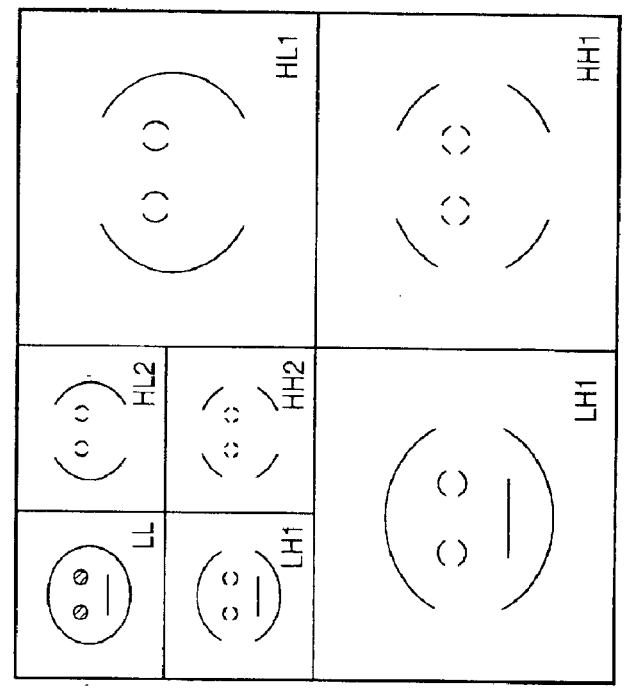
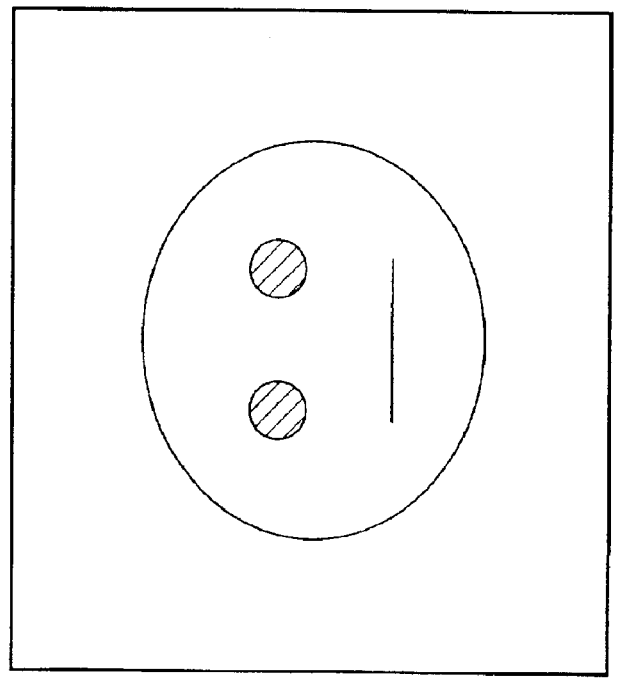

FIG. 6
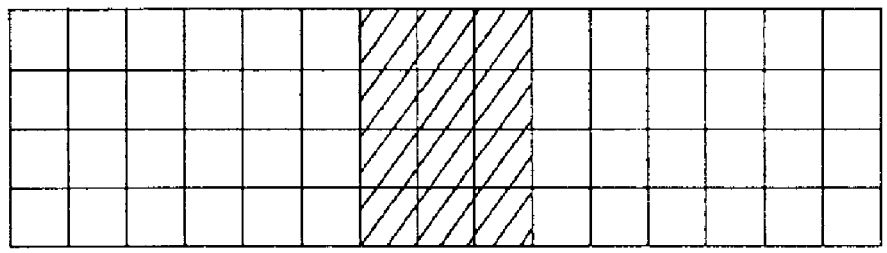
HIGH IMAGE
QUALITY
REGION
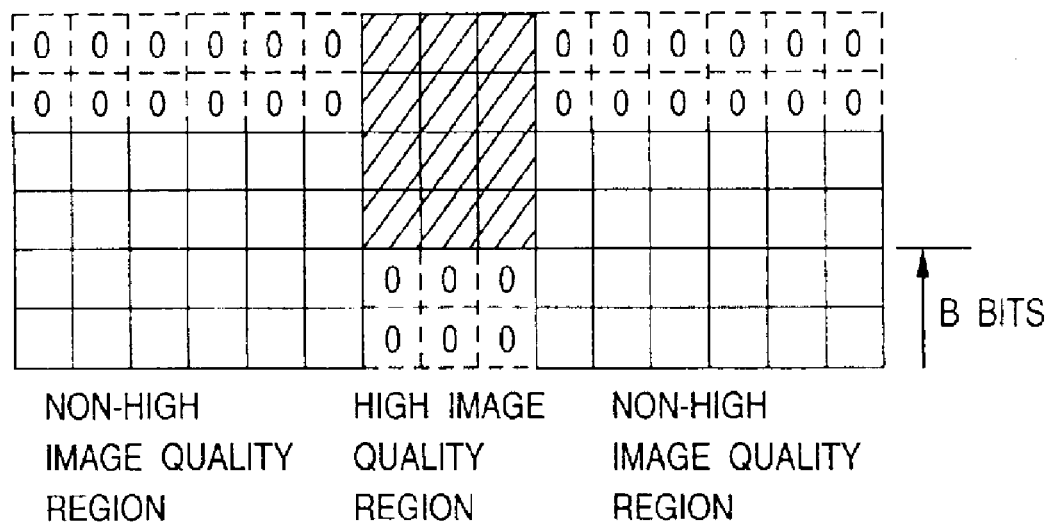
NON-HIGH          HIGH IMAGE       NON-HIGH
IMAGE QUALITY     QUALITY          IMAGE QUALITY
REGION            REGION           REGION
B BITS

TO SYSTEM CONTROLLER 22

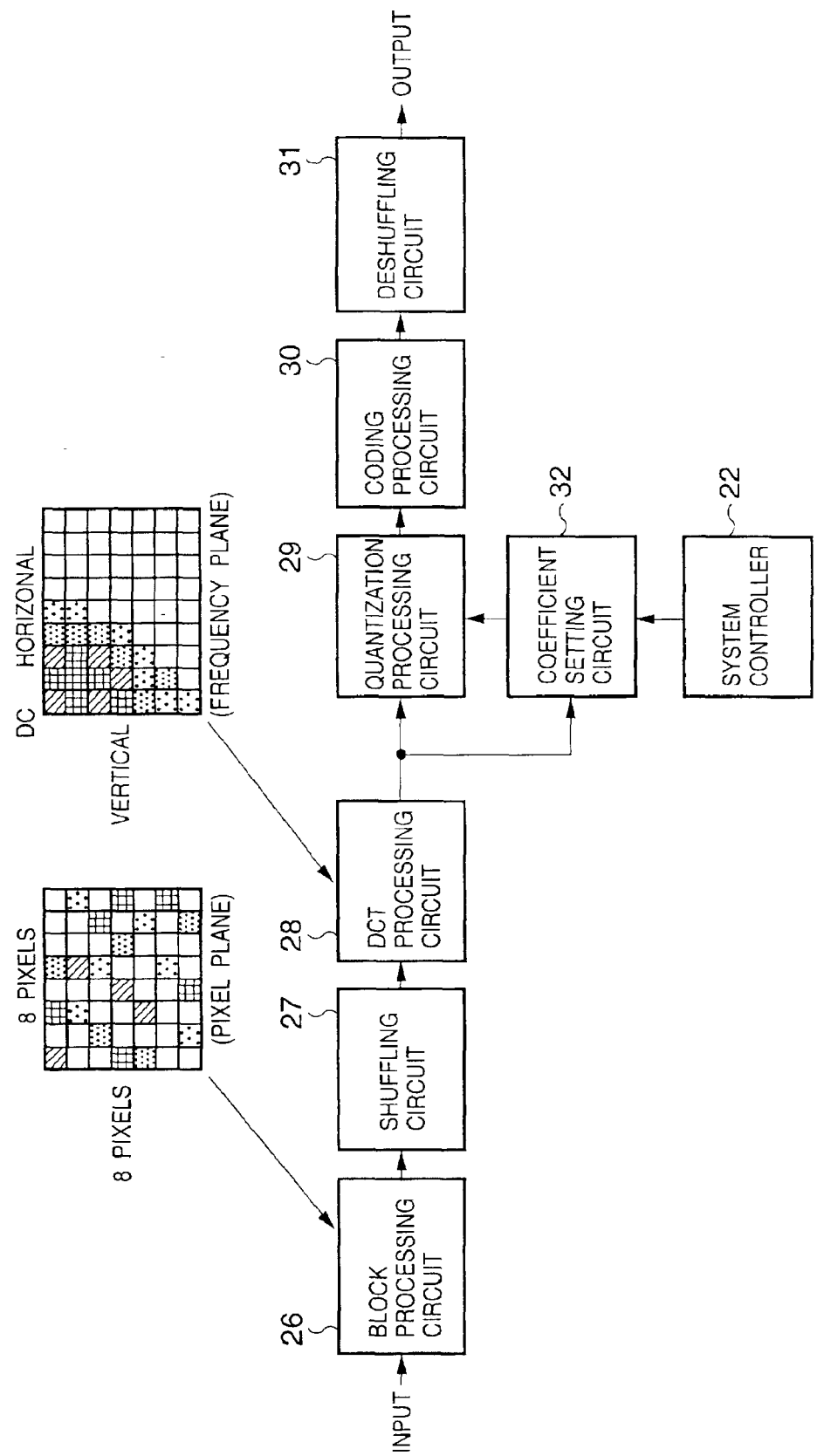

IMAGE SENSING APPARATUS, METHOD, MEMORY INVOLVING DIFFERENTIAL COMPRESSION OF DISPLAY REGION BASED ON ZOOM OPERATION OR SPEED

FIELD OF THE INVENTION

The present invention relates to an image sensing apparatus which senses an object image, and has a zoom function of enlarging/reducing a sensed image and its control method, and a computer readable memory.

BACKGROUND OF THE INVENTION

FIG. 32 shows the arrangement of a conventional image sensing apparatus.

Reference numeral 11 denotes a zoom lens for enlarging/reducing an image; 12, a focus lens for focusing an image; 13, a CCD for photoelectrically converting an image; 14, an A/D converter for converting an analog signal into a digital signal (image data); 15, a camera signal processing circuit for adjusting a sensed image; 16, a buffer memory for temporarily storing image data; 17, a D/A converter for converting a digital signal into an analog signal; 18, a monitor for displaying a sensed image; 19a, a focus motor for moving the focus lens 12; 19b, a focus motor driver for controlling driving of the focus motor 19a; 20a, a zoom motor for moving the zoom lens 11; 20b, a zoom motor driver for controlling driving of the zoom motor 20a; 21, a zoom encoder for detecting the position of the zoom lens 11; 39, a cam table used to obtain in-focus curve information corresponding to a zoom value; 22, a system controller for controlling the respective circuits; 23, a compression circuit for compressing image data; 24, a recording circuit for recording the compressed image data; and 25, a zoom lever & switch for attaining zoom operation.

Light coming from an object forms an image on the imaging surface of the CCD 13 via the zoom lens 11 and focus lens 12. The image on the imaging surface is photoelectrically converted into an analog signal by the CCD 13, and the analog signal is converted into a digital signal (image data) by the A/D converter 14. The image data undergoes image quality adjustment by the camera signal processing circuit 15, and the adjusted image data is stored in the buffer memory 16.

When a zoom instruction is issued by the zoom lever 25, sw1 and sw2 of the zoom lever 25 detect the depression state to zoom in the tele (T) or wide (W) direction, and the system controller 22 sends a signal to the zoom motor driver 20b in accordance with the detection result so as to move the zoom lens 11 via the zoom motor 20a. Likewise, the system controller 22 acquires in-focus curve information from the cam table 39, and sends a signal to the focus motor driver 19b on the basis of the acquired in-focus information so as to move the focus lens 12 via the focus motor 190a, thus zooming while maintaining an in-focus state.

The image data (digital signal) stored in the buffer memory 16 is converted into an analog signal by the D/A converter 17, and the analog signal is displayed on the monitor 18 such as a liquid crystal display (LCD) or the like.

On the other hand, the image data stored in the buffer memory 16 is compressed by high-efficiency coding in the compression circuit 23, and the compressed image data is recorded on a recording medium by the recording circuit 24.

A compression processing device that performs DCT (discrete cosine transformation)-based high-efficiency coding used in the conventional image sensing apparatus such as a digital video camera or the like will be explained below using FIG. 33.

FIG. 33 is a block diagram showing the arrangement of the compression processing device in the conventional image sensing apparatus.

Reference numeral 26 denotes a block processing circuit for forming DCT blocks; 27, a shuffling circuit for rearranging (shuffling) image data blocks; 28, a DCT processing circuit for computing orthogonal transforms; 29, a quantization processing circuit for quantizing image data; 30, a coding processing circuit for encoding the quantized image data using Huffman codes and the like; 31, a deshuffling circuit for rearranging (deshuffling) the shuffled image data blocks to restore them; and 32, a coefficient setting circuit for setting quantization coefficients in the quantization processing circuit 29.

The image data output from the buffer memory 16 is broken up into blocks each consisting of 8×8 pixels by the block processing circuit 26. Then, a total of six DCT blocks, i.e., four luminance signals and one each color difference signals, form one macroblock. The shuffling circuit 27 shuffles in units of macroblocks to equalize information amounts, and the DCT processing circuit 28 then computes orthogonal transforms. Frequency coefficient data output from the DCT processing circuit 28 are input to the quantization processing circuit 29. A set of coefficient data in units of frequency coefficients are divided by quantization coefficients set by the coefficient setting circuit 32. The set of quantized coefficient data in units of frequency components undergo Huffman coding in the coding processing circuit 30 to be converted into variable-length codes, and the deshuffling circuit 31 restores an original image arrangement and outputs the restored data to the recording circuit 24. In this way, the data size is compressed to about ⅕.

However, since the conventional image sensing apparatus such as a video camera or the like compresses an image after equalizing the entire image, the image quality may drop when the compressed image undergoes high-efficiency coding.

SUMMARY OF THE INVENTION

The present invention has been made in consideration of the conventional problems, and has as its object to provide an image sensing apparatus which can easily and efficiently designate the compression ratio of a specific region in a sensed image in correspondence with the purpose of the image, and can easily manage processed images and its control method, and a computer readable memory.

In order to achieve the above object, an image sensing apparatus according to the present invention comprises the following arrangement.

That is, an image sensing apparatus which senses an object image, and has a zoom function of enlarging/reducing a sensed image, comprises:

detection means for detecting a zoom speed of the zoom function;

display means for displaying the sensed image;

designation means for designating a desired partial region in the sensed image;

compression means for compressing a designated region designated by the designation means and a non-designated region using different characteristics; and control means for controlling the designated region on the basis of the zoom speed detected by the detection means.

Preferably, when the zoom speed detected by the detection means is less than a predetermined speed, the control means changes the designated region in synchronism with zoom operation by the zoom function.

Preferably, when the zoom speed detected by the detection means is not less than a predetermined speed, the control means changes the designated region after completion of zoom operation by the zoom function.

Preferably, when the zoom speed detected by the detection means is less than a predetermined speed, the control means changes the designated region in synchronism with zoom operation by the zoom function, and when the zoom speed detected by the detection means is not less than a predetermined speed, the control means changes the designated region after completion of the zoom operation.

Preferably, when the zoom speed detected by the detection means is not less than a predetermined speed, the control means cancels the designated region during zoom operation by the zoom function, and changes the designated region after completion of the zoom operation.

Preferably, the compression means compresses the designated region at a lower compression ratio than the non-designated region.

Preferably, the compression means includes discrete wavelet transformation.

Preferably, the display means displays the designated and non-designated regions distinct from each other.

In order to achieve the above object, a control method of an image sensing apparatus according to the present invention comprises the following arrangement.

That is, a control method for an image sensing apparatus which senses an object image, and has a zoom function of enlarging/reducing a sensed image, comprises:

the detection step of detecting a zoom speed of the zoom function;

the display step of displaying the sensed image;

the designation step of designating a desired partial region in the sensed image;

the compression step of compressing a designated region designated in the designation step and a non-designated region using different characteristics; and the control step of controlling the designated region on the basis of the zoom speed detected in the detection step.

In order to achieve the above object, a computer readable memory according to the present invention comprises the following arrangement.

That is, a computer readable memory that stores a program code for controlling an image sensing apparatus which senses an object image, and has a zoom function of enlarging/reducing a sensed image, comprises:

a program code of the detection step of detecting a zoom speed of the zoom function;

a program code of the display step of displaying the sensed image;

a program code of the designation step of designating a desired partial region in the sensed image;

a program code of the compression step of compressing a designated region designated in the designation step and a non-designated region using different characteristics; and a program code of the control step of controlling the designated region on the basis of the zoom speed detected in the detection step.

In order to achieve the above object, an image sensing apparatus according to the present invention comprises the following arrangement.

That is, an image sensing apparatus which senses an object image, and has a zoom function of enlarging/reducing a sensed image, comprises:

operation means for executing enlargement/reduction zoom operation by the zoom function;

display means for displaying the sensed image;

designation means for designating a desired partial region in the sensed image;

compression means for compressing a designated region designated by the designation means and a non-designated region using different characteristics; and control means for controlling the designated region on the basis of zoom operation by the operation means.

Preferably, the control means changes the designated region in accordance with zoom operation by the operation means.

Preferably, the control means inhibits the designated region from being changed during zoom operation by the operation means, and changes the designated region on the basis of operation contents of the zoom operation after completion of the zoom operation.

Preferably, the control means cancels region information that pertains to the designated region during zoom operation by the operation means, and changes the designated region on the basis of operation contents of the zoom operation after completion of the zoom operation.

Preferably, the compression means compresses the designated region at a lower compression ratio than the non-designated region.

Preferably, the compression means includes discrete wavelet transformation.

Preferably, the display means displays the designated and non-designated regions distinct from each other.

In order to achieve the above object, a control method of an image sensing apparatus according to the present invention comprises the following arrangement.

That is, a control method for an image sensing apparatus which senses an object image, and has a zoom function of enlarging/reducing a sensed image, comprises:

the display step of displaying the sensed image;

the designation step of designating a desired partial region in the sensed image;

the compression step of compressing a designated region designated in the designation step and a non-designated region using different characteristics; and the control step of controlling the designated region on the basis of enlargement/reduction zoom operation by the zoom function.

In order to achieve the above object, a computer readable memory according to the present invention comprises the following arrangement.

That is, a computer readable memory that stores a program code for controlling an image sensing apparatus which senses an object image, and has a zoom function of enlarging/reducing a sensed image, comprises:

a program code of the display step of displaying the sensed image;

a program code of the designation step of designating a desired partial region in the sensed image;

a program code of the compression step of compressing a designated region designated in the designation step and a non-designated region using different characteristics; and a program code of the control step of controlling the designated region on the basis of enlargement/reduction zoom operation by the zoom function.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows the configuration of a coefficient group of the two-dimensional discrete wavelet transformer according to the first embodiment of the present invention;

FIG. 6 shows an example of a change in quantization index as a result of a shift-up process according to the first embodiment of the present invention;

FIG. 33 is a block diagram showing the arrangement of a compression processing device in the conventional image sensing apparatus.

DESCRIPTION OF THE PREFERRED EMBODIMENTS

Preferred embodiments of the present invention will be described in detail hereinafter with reference to the accompanying drawings.

First Embodiment

The basic arrangement of a compression circuit that performs high-efficiency coding used in the present invention will be explained first.

Figure 1:
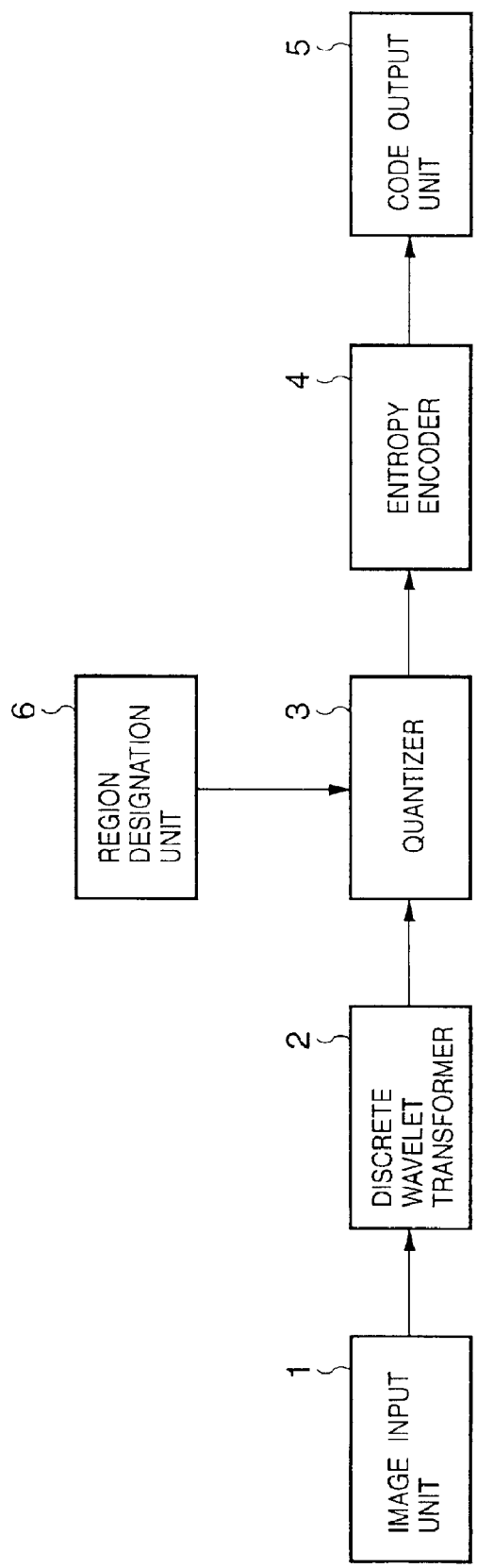
FIG. 1 is a block diagram showing the basic arrangement of a compression circuit used in the first embodiment of the present invention.

FIG. 1 is a block diagram showing the basic arrangement of a compression circuit used in the first embodiment of the present invention.

Referring to FIG. 1, reference numeral 1 denotes an image input unit; 2, a discrete wavelet transformer; 3, a quantizer; 4, an entropy encoder; 5, a code output unit; and 6, a region designation unit.

The image input unit 1 receives pixel signals that form an image to be encoded in the raster scan order, and its output is supplied to the discrete wavelet transformer 2. In the following description, an image signal represents a monochrome multi-valued image. However, when a plurality of color components of a color image or the like are to be encoded, each of R, G, and B color components or a luminance component and chromaticity components such as R-Y, B-Y, and the like can be independently compressed in the same manner as described above.

The discrete wavelet transformer 2 executes a two-dimensional wavelet transformation process for the input image data, and computes and outputs transform coefficients. The basic arrangement of the discrete wavelet transformer 2 will be described below using FIG. 2.

Figure 2:
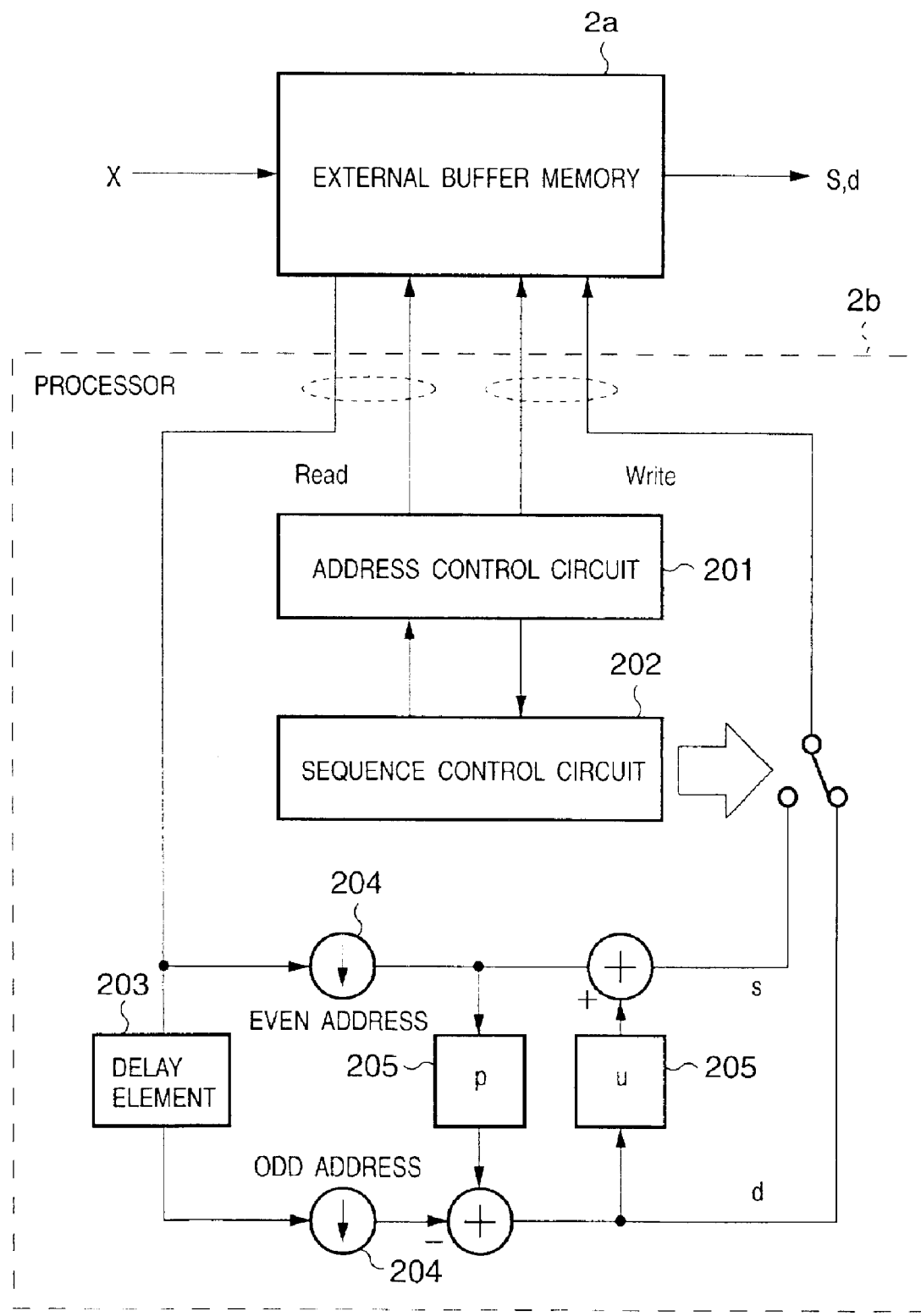
FIG. 2 is a block diagram showing the basic arrangement of a discrete wavelet transformer according to the first embodiment of the present invention.

FIG. 2 shows the basic arrangement of the discrete wavelet transformer according to the first embodiment of the present invention.

Referring to FIG. 2, an input image signal x is stored in a memory 2a, is sequentially read out by a processor 2b to undergo the discrete wavelet transformation process, and is written in the memory 2a again. The arrangement of the process in the processor 2b will be explained below. Upon receiving a read instruction from a sequence control circuit 202 in the processor 2b, an image signal x stored in the processing buffer memory 2a at the address designated by an address control circuit 201 is read by the processor 2b. The read image signal x is separated into odd and even address signals by a combination of a delay element 203 and down samplers 204, and these signals undergo filter processes of two filters 205 (p) and 206 (u). In FIG. 2, s and d represent low- and high-pass coefficients upon decomposing a linear image signal to one level, and are respectively computed by:

$$d(n)=x(2*n+1)-\text{floor}((x(2*n)+x(2*n+2))/2) \quad (1)$$

$$s(n)=x(2*n)+\text{floor}((d(n-1)+d(n))/4) \quad (2)$$

where x(n) is an image signal to be transformed, and floor(x) indicates a maximum integer smaller than x.

Upon issuing a write instruction from the sequence control circuit 202, low- and high-pass coefficients s and d used to decompose a signal to one level are stored again in the processing buffer memory 2a at the address designated by the address control circuit 201.

With the aforementioned process, the linear discrete wavelet transformation process is done for the image signal x.

The arrangement of a two-dimensional discrete wavelet transformer will be explained below using FIG. 3.

Figure 3:
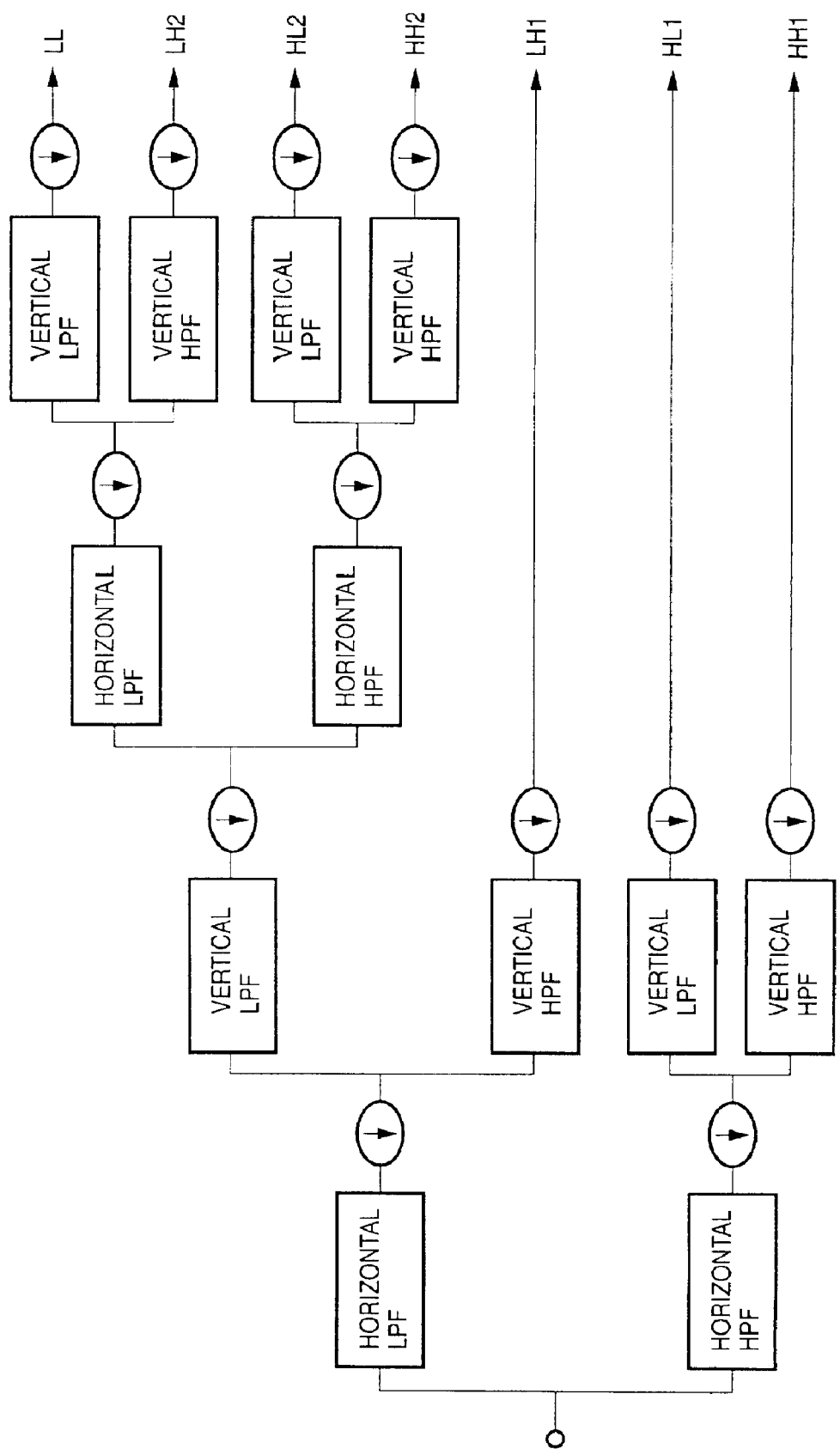
FIG. 3 is a block diagram showing the arrangement of a two-dimensional discrete wavelet transformer according to the first embodiment of the present invention.

FIG. 3 is a block diagram showing the arrangement of a two-dimensional discrete wavelet transformer according to the first embodiment of the present invention.

Referring to FIG. 3, two-dimensional discrete wavelet transformation is implemented by sequentially executing linear transformation in the horizontal and vertical directions of an image. An input image signal undergoes a wavelet transformation process in the horizontal direction and is decomposed into low- and high-pass coefficients. After that, data is decimated to be halved by downsizing (downward arrow). As coefficient components generated as a result of repeating the aforementioned process for components obtained by executing low-pass filtering of the output image signal in the horizontal and vertical directions, coefficient data with a reduced data size are accumulated in a low-frequency region as frequency divisions in the horizontal and vertical directions. FIG. 4 shows an example of the format of transformation coefficient groups of two levels obtained by the two-dimensional discrete wavelet transformation process. An image signal is decomposed into coefficient sequences HH1, HL1, LH1, HH2, HL2, LH2, and LL in different frequency bands. Note that these coefficient sequences will be referred to as subbands hereinafter. The coefficient data of the individual subbands are output to the quantizer 3.

The description will revert to FIG. 1.

The region designation unit 6 designates a region (ROI: region of interest) to be decoded to have higher image quality than the surrounding portions in an image to be encoded, and generates mask information indicating coefficients that belong to the designated region upon computing the discrete wavelet transforms of the image to be encoded. An example of the mask information will be explained below using FIG. 5.

Figure 5:
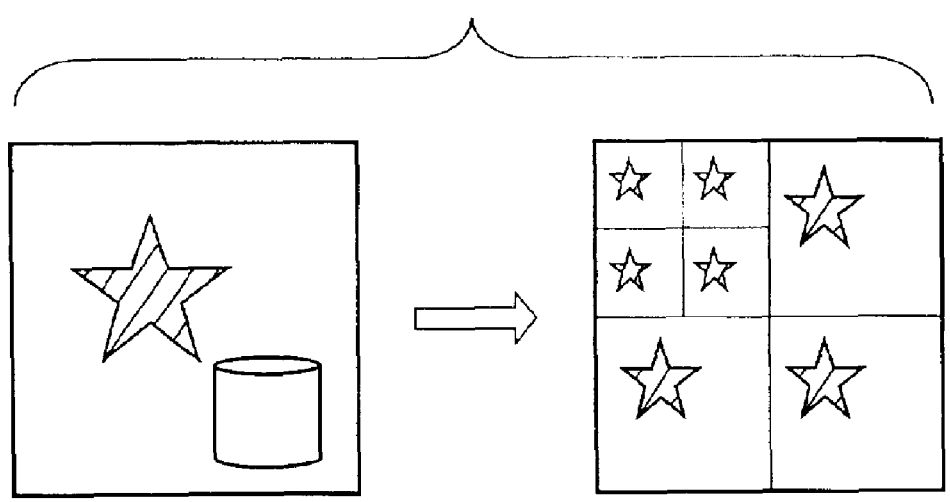
FIG. 5 shows an example of mask information according to the first embodiment of the present invention.

FIG. 5 shows an example of mask information according to the first embodiment of the present invention.

Referring to FIG. 5, when a star-shaped region in a left input image is designated by a predetermined instruction input, the region designation unit 6 computes portions to be included in respective subbands upon computing the discrete wavelet transforms of the image including this designated region. The region indicated by this mask information corresponds to a range including coefficient data of the surrounding region required for reconstructing an image signal on the boundary of the designated region.

The right image in FIG. 5 shows an example of the mask information computed in this way. In this example, mask information upon discrete wavelet transformation of the left image at two levels in FIG. 5 is computed, as shown in FIG. 5. In FIG. 5, a star-shaped portion corresponds to the designated region, bits of the mask information in this designated region are set at "1", and other bits of the mask information are set at "0". Since the entire mask information has the same format as coefficient data of two-dimensional discrete wavelet transformation, whether or not coefficient data at a corresponding position belongs to the designated region can be identified by checking the corresponding bit in the mask information. The mask information generated in this manner is output to the quantizer 3.

Furthermore, the region designation unit 6 receives parameters for designating the image quality of that designated region from an input system (not shown). These parameters may be either numerical values that express a compression ratio to be assigned to the designated region or those indicating image quality. The region designation unit 6 computes a bit shift amount B for coefficient data in the designated region, and outputs it to the quantizer 3 together with the mask.

The quantizer 3 quantizes the input coefficient data by a predetermined quantization coefficient, and outputs indices corresponding to the quantized values. In this case, quantization is described by:

$$q=\text{sign}(c)\text{floor}(abs(c)/\Delta) \quad (3)$$

$$\text{sign}(c)=1; \ c \geq 0 \quad (4)$$

$$\text{sign}(c)=-1; \ c<0 \quad (5)$$

where c is a coefficient to be quantized. Also, Δ is a quantization coefficient, and the value Δ includes "1". However, when Δ=1, no quantization is done in practice.

The quantizer 3 changes the quantization index on the basis of the mask information and bit shift amount B input from the region designation unit 6 by:

$$q^*=q*2^B; \ m=1 \quad (6)$$

$$q^*=q; \ m=0 \quad (7)$$

where m is the mask information value at the position of the quantization index of interest. With the aforementioned process, only quantization indices that belong to the spatial region designated by the region designation unit 6 are shifted to the MSB side by the number of bits of the bit shift amount B.

FIG. 6 shows changes in quantization index by the shift-up process. An upper figure in FIG. 6 shows quantization indices of given subbands. When the mask value="1" and the shift value B="2" in the hatched quantization indices, the quantization indices after bit shifts are as shown in a lower figure in FIG. 6. Note that bits "0" are stored in blanks formed as a result of this bit shift process, as shown in FIG. 6.

The quantization indices changed in this manner are output to the entropy encoder 4.

Note that the mask information in this embodiment is used not only in the shift-up process but also to accurately restore an original image from data obtained after encoding by the entropy encoder 4. However, the present invention is not limited to this. For example, if the bit shift value B is set to be equal to the number of bits (4 bits in FIG. 6) of each quantization index which is to undergo the bit shift process, a decoder can easily discriminate the ROI and other regions without receiving any mask information, and can accurately restore an original image.

The entropy encoder 4 decomposes the quantization indices input from the quantizer 3 into bit planes, executes binary arithmetic coding in units of bit planes, and outputs a code stream. The operation of the entropy encoder 4 will be explained below using FIG. 7.

Figure 7:
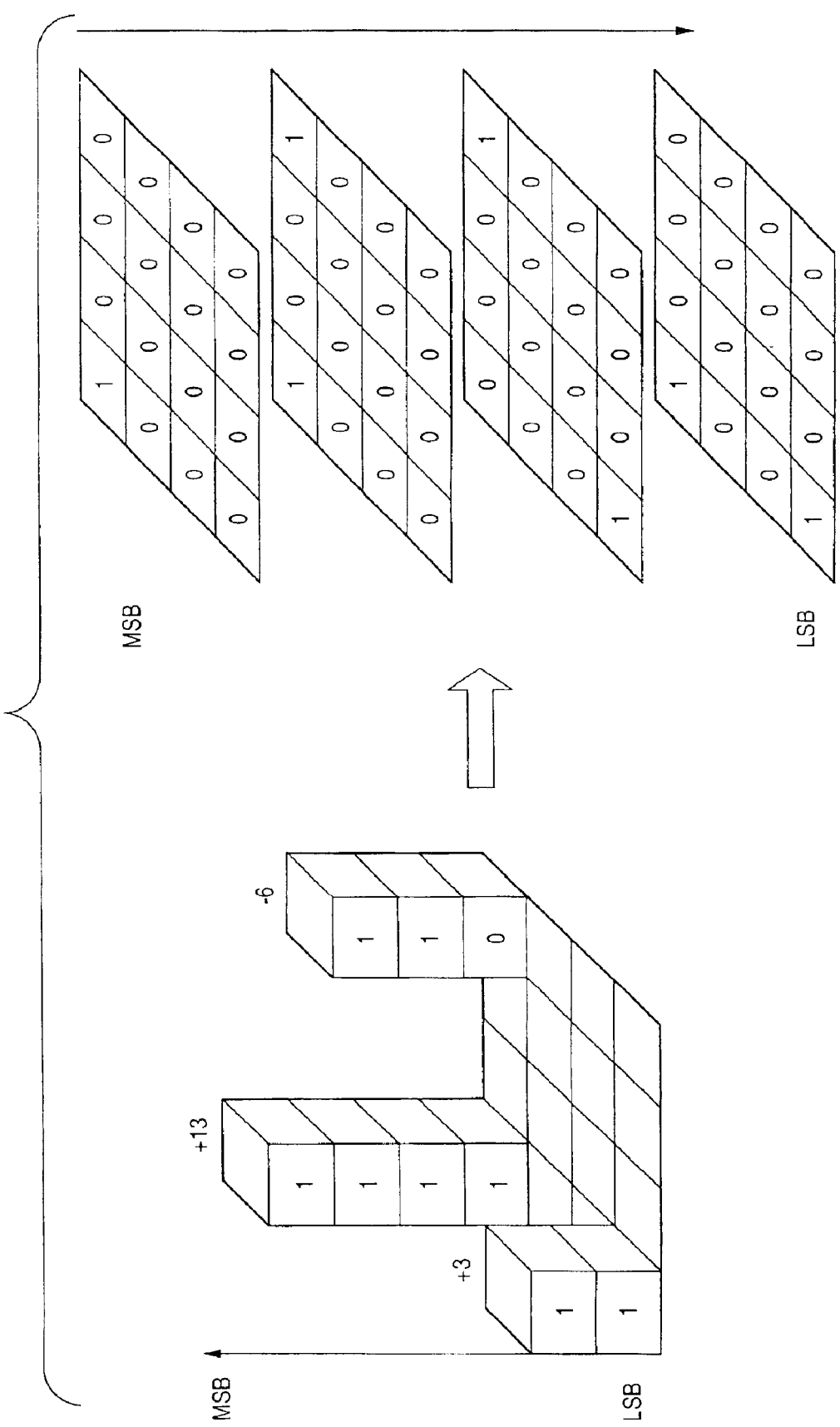
FIG. 7 is a view for explaining the operation of an entropy encoder 4 according to the first embodiment of the present invention.

FIG. 7 is a view for explaining the operation of the entropy encoder 4 according to the first embodiment of the present invention.

In this example, a 4×4 subband region includes three nonzero indices, which respectively have values "+13", "−6", and "+3". The entropy encoder 4 scans this region to obtain a maximum value M, and computes the number S of bits required for expressing the maximum quantization index by:

$$S=\text{ceil}(\log_2(abs(M))) \quad (8)$$

where ceil(x) is the smallest one of integers equal to or larger than x.

In FIG. 7, since the maximum coefficient value is "13", equation (8) yields S=4. Hence, 16 quantization indices in the sequence are processed in units of four bit planes, as indicated by the right side in FIG. 7. The entropy encoder 4 makes binary arithmetic coding of bits of the most significant bit plane (indicated by MSB in FIG. 7) first, and outputs the coding result as a bitstream.

Then, the encoder 4 lowers the bit plane by one level, and encodes and outputs bits of each bit plane to the code output unit 5 until the bit plane of interest reaches the least significant bit plane (indicated by LSB in FIG. 7). At this time, a code of each quantization index is entropy-encoded immediately after the first nonzero bit is detected upon scanning the bit plane.

In the aforementioned process, the compression ratio of the entire image to be encoded can be controlled by changing the quantization coefficient Δ.

In the first embodiment, when lower bits of a bit plane to be encoded by the entropy encoder 4 can be limited (discarded) in correspondence with a required compression ratio, not all bit planes are encoded, but bit planes from the most significant bit plane to a bit plane corresponding in number to the required compression ratio are encoded.

By adopting the function of limiting lower bit planes, only bits corresponding to the designated region shown in FIG. 5 are included in large quantity in the code sequence. That is, since only the designated region can be compressed at a low compression ratio, it can be encoded as a high-quality image.

An image sensing apparatus (video camera) using the aforementioned compression circuit will be described below using FIG. 8.

Figure 8:
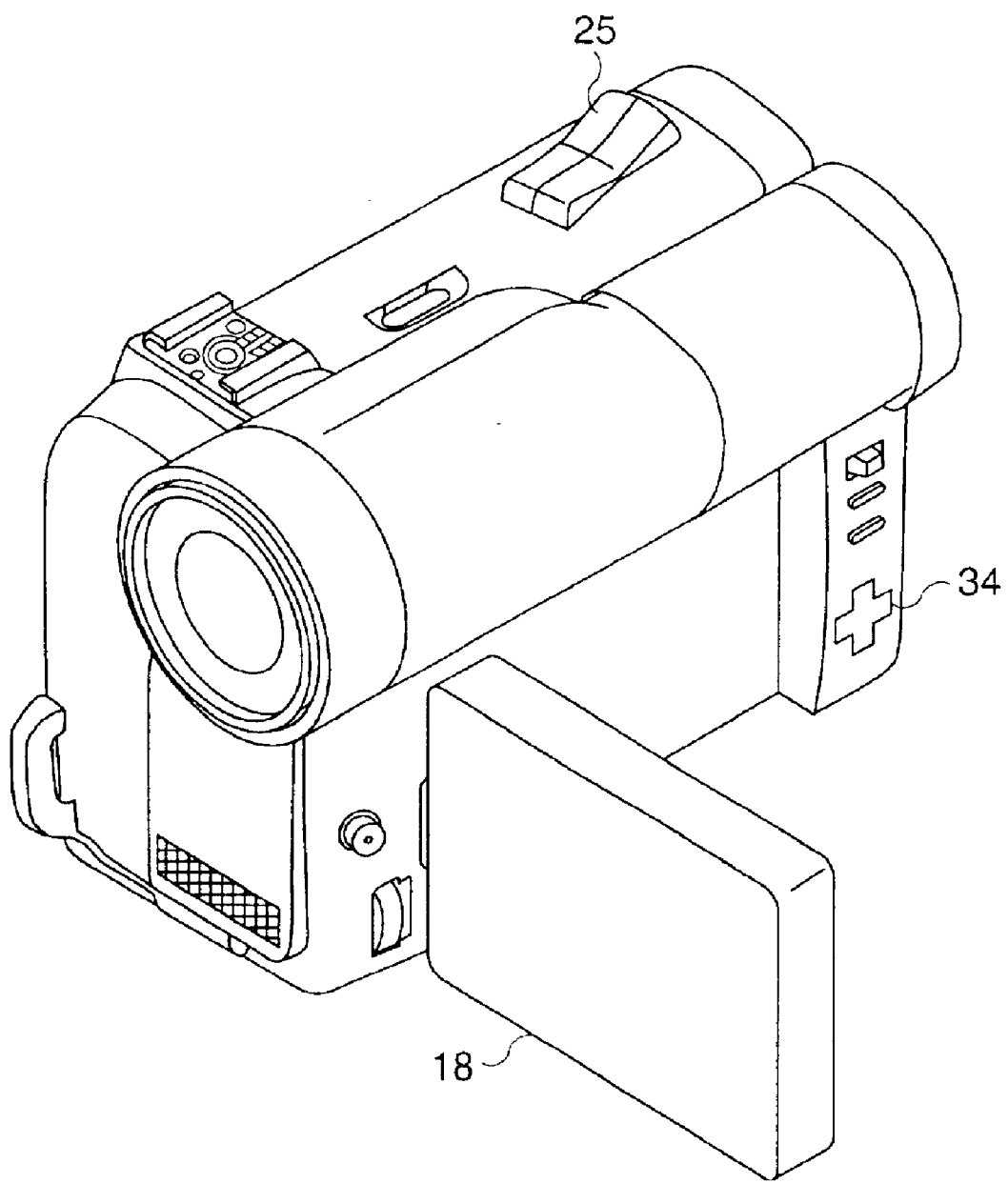
FIG. 8 is a perspective view showing the outer appearance of an image sensing apparatus according to the first embodiment of the present invention.
Figure 9:
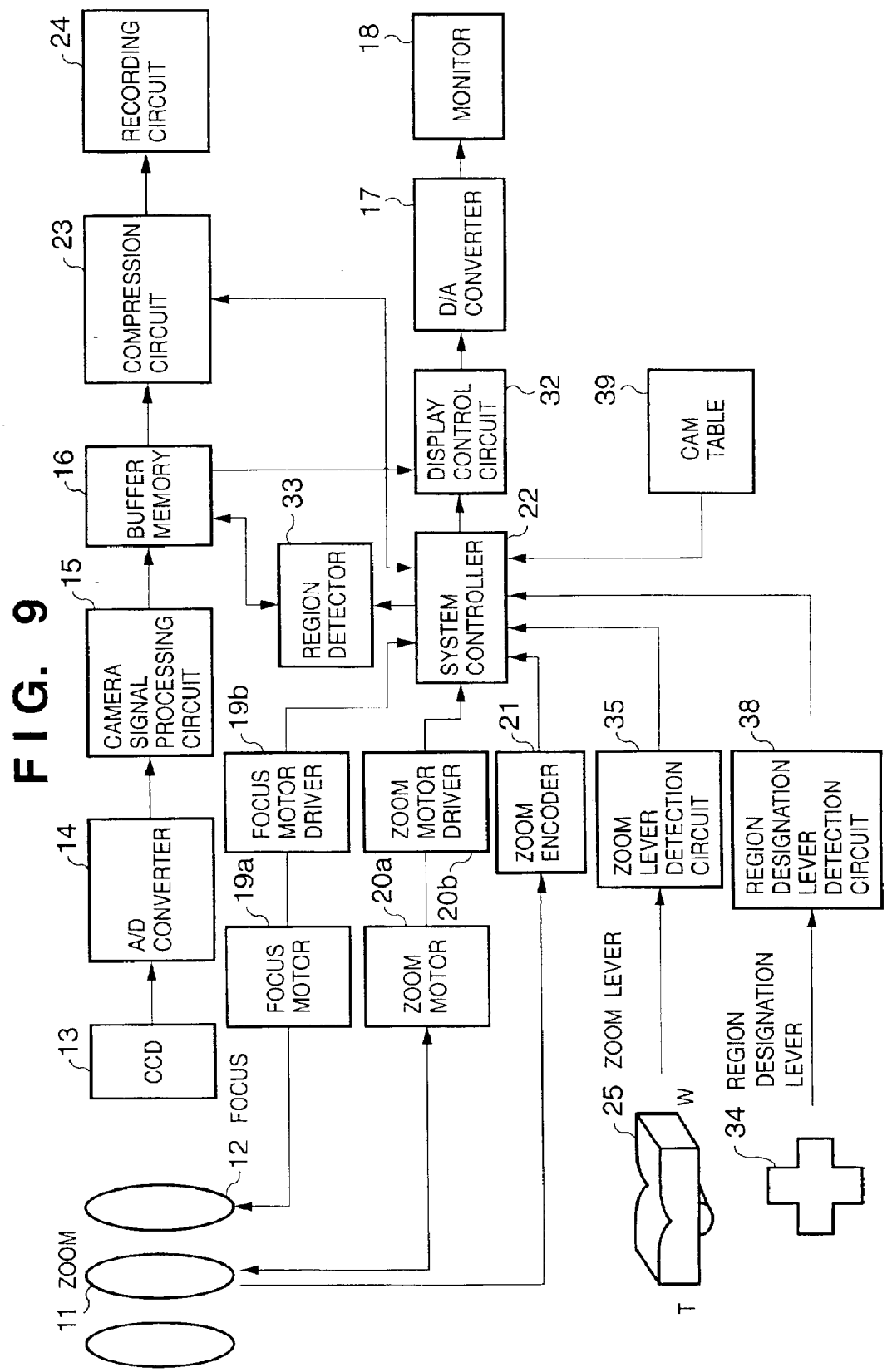
FIG. 9 is a block diagram showing the arrangement of the image sensing apparatus according to the first embodiment of the present invention.
Figure 10:
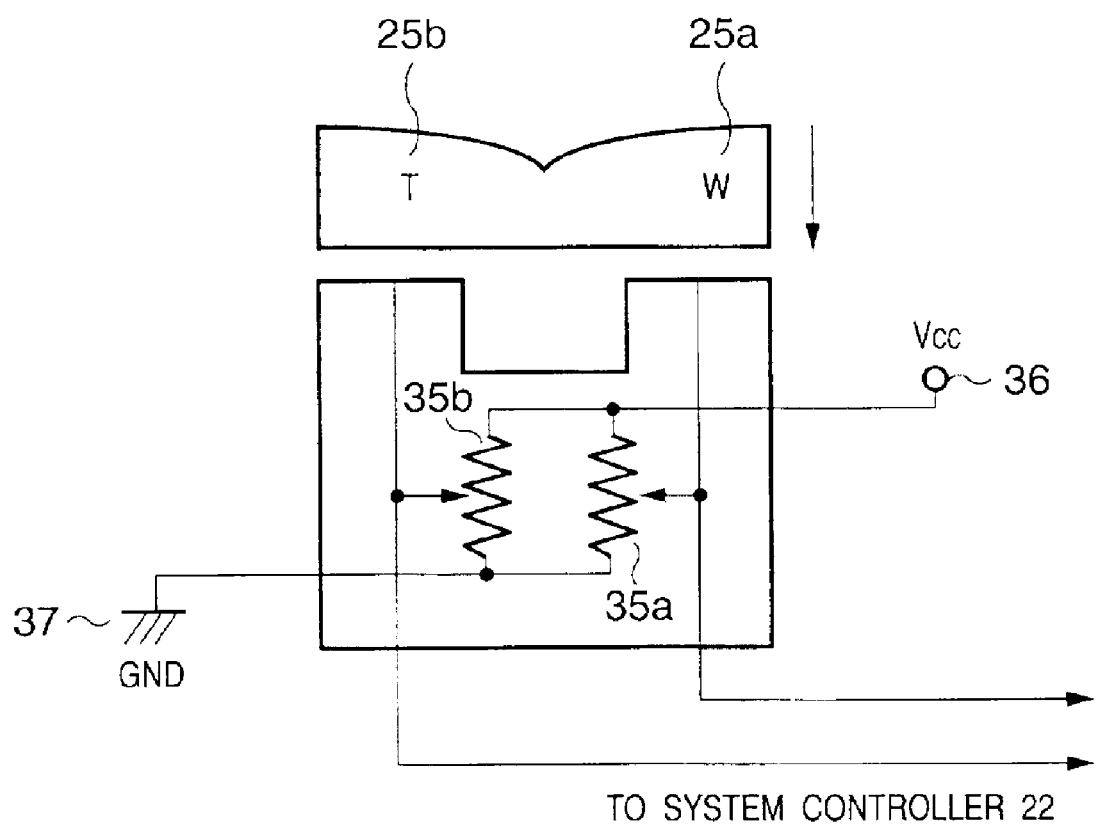
FIG. 10 is a diagram showing details of the arrangement of a zoom lever detection circuit according to the first embodiment of the present invention.

FIG. 8 shows the outer appearance of an image sensing apparatus according to the first embodiment of the present invention, FIG. 9 is a block diagram showing the arrangement of the image sensing apparatus according to the first embodiment of the present invention, and FIG. 10 is a diagram showing details of the arrangement of a zoom lever detection circuit according to the first embodiment of the present invention.

Figure 32:
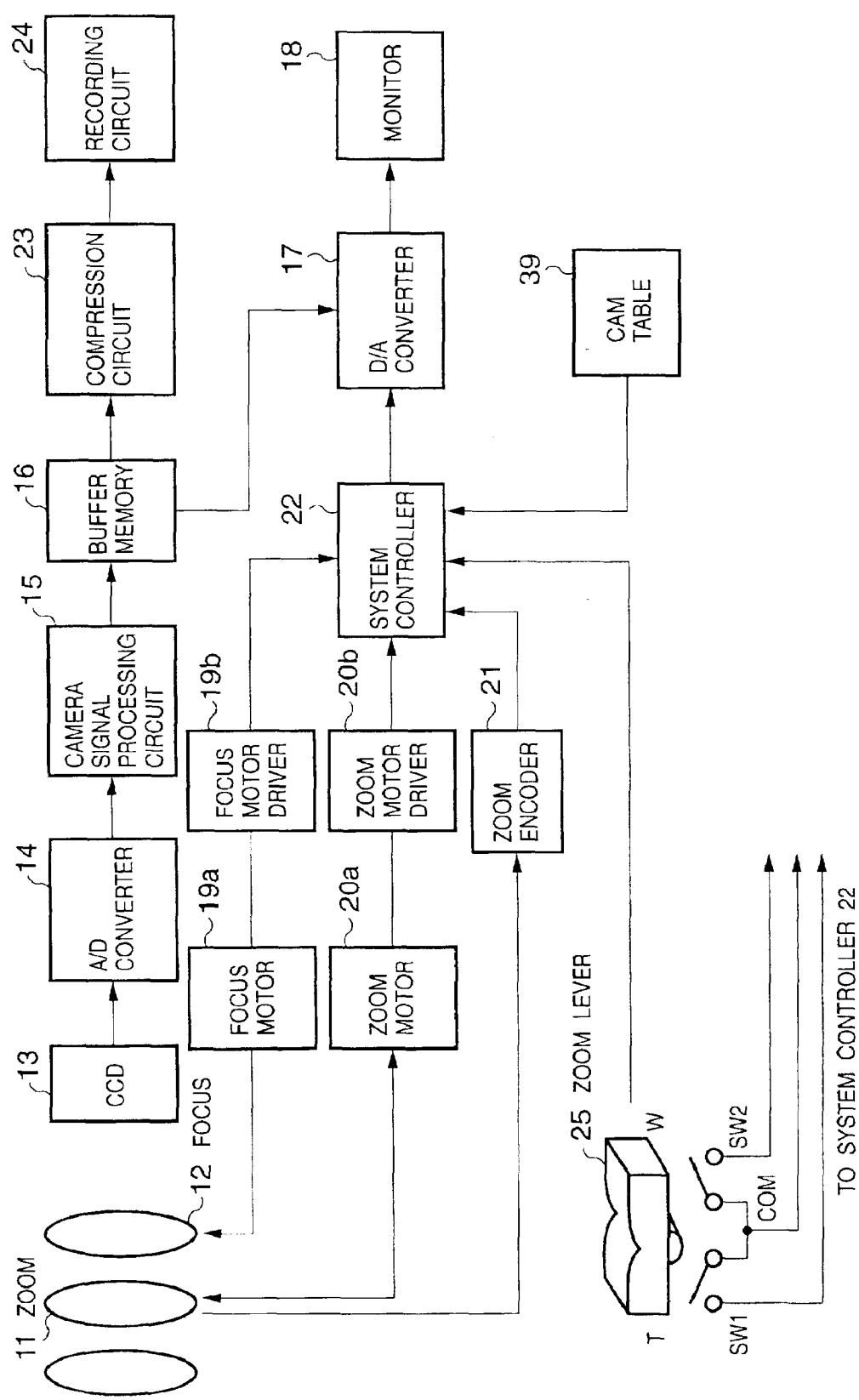
FIG. 32 is a block diagram showing the arrangement of a conventional image sensing apparatus.

Note that the image sensing apparatus (e.g., a video camera) of this embodiment can sense a moving image or (and) still image. The same reference numerals denote the same building components as those in the conventional image sensing apparatus shown in FIG. 32, and a detailed description of building components having the same functions will be omitted.

Reference numeral 11 denotes a zoom lens for changing the zoom ratio; 20a, a zoom motor for moving the zoom lens 11; 20b, a zoom motor driver for driving the zoom motor 20a by controlling its speed; 21, a zoom encoder for detecting the position of the zoom lens 11; 25a, a wide switch (W) for issuing an instruction for moving the zoom lens 11 to the wide-angle side; 25b, a tele switch (T) for issuing an instruction for moving the zoom lens 11 to the telephoto side; 35, a zoom lever detection circuit for detecting the depression state of a zoom lever 25; 35a, a variable resistor for converting the depression state of the wide switch 25a into a resistance value; 35b, a variable resistor for converting the depression state of the tele switch 25b into a resistance value; 34, a region designation lever for designating an arbitrary region in an image displayed on a monitor 18; 38, a region designation lever detection circuit for detecting the depression state of the region designation lever 34; 33, a region detector for generating region information based on the region designated by the region designation lever 34; 16, a buffer memory for storing image data and region information; 32, a display control circuit for generating a display signal by generating an image indicating the designated region based on the region information and superposing it on sensed image data; 23, a compression circuit for respectively encoding the designated region and a non-designated region on the basis of the region information; and 36, a power supply of the image sensing apparatus; and 37, ground.

Light coming from an object is zoomed by the zoom lens 11, and the zoomed light is focused by a focus lens 12. The focused light forms an image on the imaging surface of a CCD 13. The image on the imaging surface is photoelectrically converted by the CCD 13 into an analog signal, which is converted into a digital signal (image data) by an A/D converter 14. The digital signal forms a color image in a camera signal processing circuit 15 and undergoes adjustment of image quality such as gain, white balance, and the like. Image data (digital signal) output from the camera signal processing circuit 15 is stored in a buffer memory 16, and is used to generate a display signal by the display control circuit 32. After that, the display signal is converted into an analog signal by a D/A converter 17, and the analog signal is displayed on a monitor 18.

Note that the output from the buffer memory 16 has a sufficiently short delay time, but if such delay time disturbs image sensing, image data may be supplied from a position before or in the buffer memory 16 to the display control circuit 32.

On the other hand, image data stored in the buffer memory 16 is compressed by coding in the compression circuit 23, and the compressed image data is recorded by a recording circuit 24 using a magnetic tape, optical disk, semiconductor memory, or the like.

When a region to be decoded to have higher image quality (high image quality region) is designated by the region designation lever 34 using an image displayed on the monitor 18, the region detection circuit 33 generates region information based on the designated region, and stores it in the buffer memory 16. The image data and region information stored in the buffer memory 16 are sent to the display control circuit 32 to generate a display signal formed by superposing a frame indicating the designated region on the image data. The display signal superposed with the designated region is converted into an analog signal by the D/A converter 17, and the analog signal is displayed on the monitor 18. An example of the output state of the monitor 18 will be explained below using FIG. 11.

Figure 11:
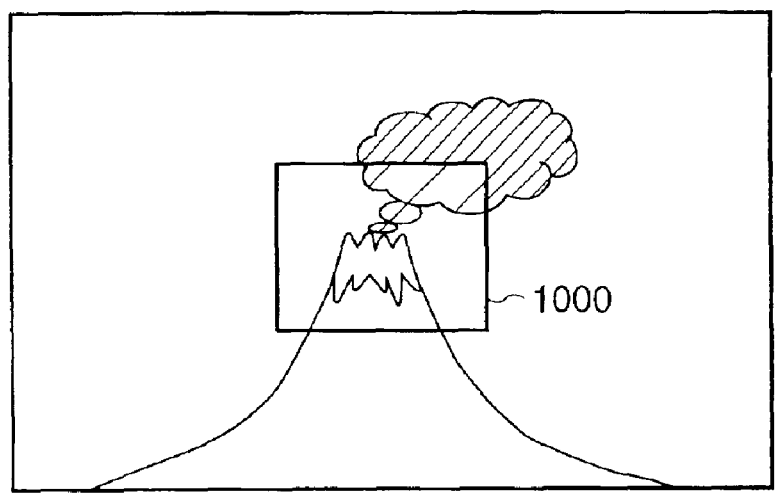
FIG. 11 shows an example of the output state on a monitor according to the first embodiment of the present invention.

FIG. 11 shows an example of the output state of the monitor according to the first embodiment of the present invention.

FIG. 11 shows an example of a display image after the high image quality region is designated by the region designation lever 34, and the designated region is displayed to be distinguished from a non-designated region. That is, the designated region is indicated by a rectangle 1000.

On the other hand, the image data and region information stored in the buffer memory 16 are sent to the compression circuit 23, and the image data is compressed by an encoding process which is separately done for a portion to be compressed with high image quality (designated region), and a portion to be normally compressed (non-designated region). The compressed image data is recorded by the recording circuit 24.

Zoom operation of the image sensing apparatus in the first embodiment will be described below.

The image sensing apparatus in the first embodiment can attain zoom operation by operating the zoom lever 25, and can control the zoom speed in correspondence with the depression amount of the zoom lever 25.

Practical operation will be explained below using FIG. 10.

Upon depression of the wide switch 25a, the resistance value of the variable resistor 35a in the zoom lever detection circuit 35 changes in accordance with the depression state of the wide switch 25a. Two terminals of the variable resistor 35a are connected to Vcc 36 which is equal to, e.g., the power supply of a system controller 22, and the ground 37, and a voltage within this range is sent to the system controller 22 as an output (voltage information).

Likewise, upon depression of the tele switch 25b, the resistance value of the variable resistor 35b in the zoom lever detection circuit 35 changes in accordance with the depression state of the tele switch 25b. As described above, two terminals of the variable resistor 35b are connected to-the Vcc 36 which is equal to, e.g., the power supply of a system controller 22, and the ground 37, and a voltage within this range is sent to the system controller 22 as an output (voltage information).

Based on such voltage information, the system controller 22 computes a zoom speed (zoom data) in accordance with a predetermined algorithm, and the zoom motor driver 20b controls rotation of the zoom motor 20a using the computed zoom data to move the zoom lens 11. A focus motor driver 19b controls a focus motor 19a on the basis of in-focus curve information in a cam table 39 corresponding to the set zoom value, thus moving the focus lens 12. In this manner, since the resistance values of the variable resistors 35a and 35b change in accordance with the depression amount of the zoom lever 25, the zoom speed can be controlled.

In place of the above arrangement, a rotary switch and an encoder for detecting the rotation amount may be combined to control the zoom speed in accordance with the rotation amount.

The arrangement of the compression circuit 23 of the image sensing apparatus-will be described in detail below using FIG. 12.

Figure 12:
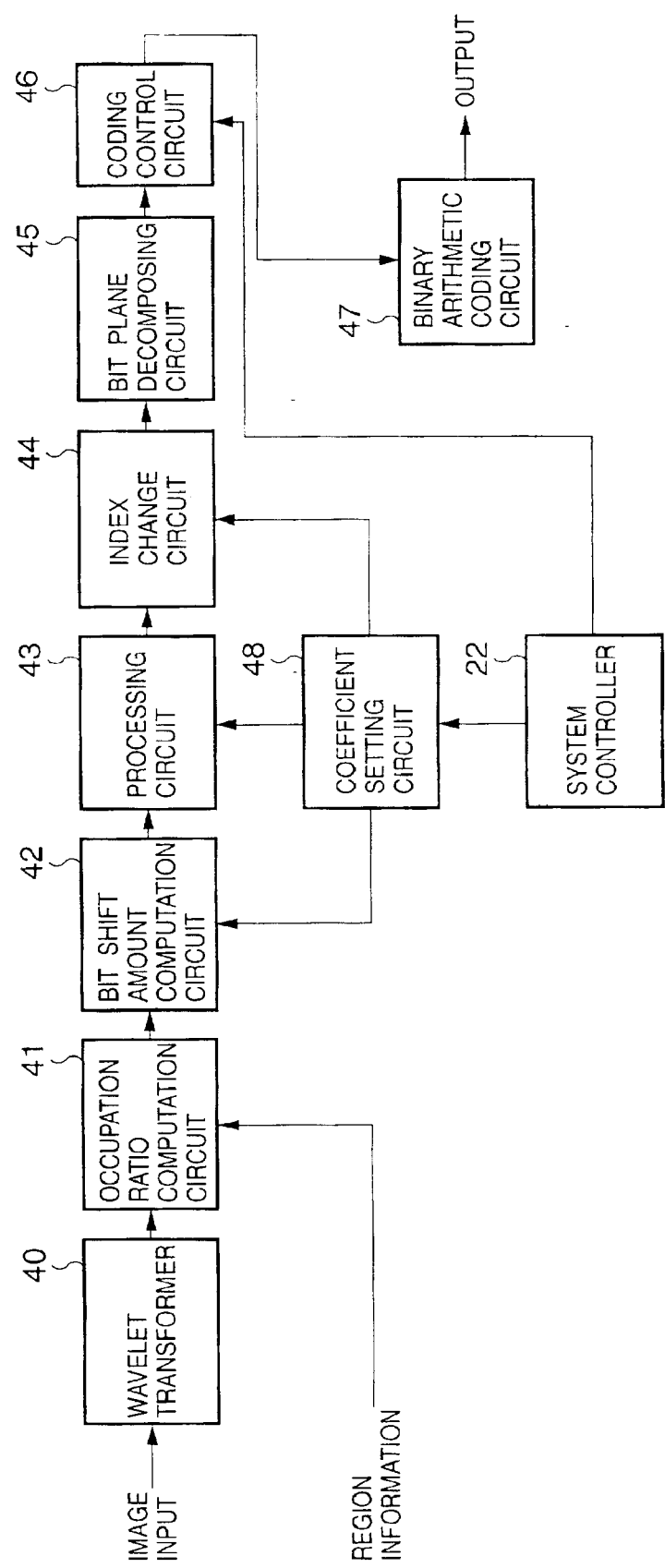
FIG. 12 is a block diagram showing details of the arrangement of a compression circuit according to the first embodiment of the present invention.

FIG. 12 is a block diagram showing details of the arrangement of the compression circuit according to the first embodiment of the present invention.

Reference numeral 40 denotes a wavelet transformer for decomposing input image data into subbands; 41, an occupation ratio computation circuit for generating mask information indicating coefficient data of each decomposed subband, which belongs to the designated region, and computing the occupation ratio of the mask information; 42, a bit shift amount computation circuit for computing a bit shift amount of image data in the mask information; 43, a quantization processing circuit for performing quantization; 48, a coefficient setting circuit for setting parameters that pertain to compression, and quantization coefficients; 44, an index change circuit for changing quantization indices in accordance with the bit shift amount; 45, a bit plane decomposing circuit for decomposing quantization indices into bit planes; 46, a coding control circuit for limiting the recording rate; and 47, a binary arithmetic coding circuit.

Image data stored in the buffer memory 16 is segmented into subbands by the wavelet transformer 40. The segmented subbands are input to the occupation ratio computation circuit 41, which generates mask information, and computes the occupation ratio of the mask information in each subband.

The bit shift amount computation circuit 42 acquires parameters for designating the image quality of the designated region from the coefficient setting circuit 48. These parameters may be either numerical values that express a compression ratio to be assigned to the designated region or those indicating image quality. The bit shift amount computation circuit 42 computes the bit shift amount of coefficient data in the designated region using the parameters, and outputs the bit shift amount to the quantization processing circuit 43. The quantization processing circuit 43 quantizes coefficient data by dividing them by quantization coefficients set by the coefficient setting circuit 48, and outputs quantization indices corresponding to the quantized values.

The index change circuit 44 shifts only quantization indices which belong to the designated spatial region to the MSB side. The quantization indices changed in this way are output to the bit plane decomposing circuit 45. The bit plane decomposing circuit 45 decomposes the input quantization indices into bit planes. The coding control circuit 46 computes bit planes to determine the data size of the entire frame after compression. The binary arithmetic coding circuit 47 executes binary coding of bit planes in turn from the most significant bit plane, and outputs the coding result as a bitstream. The bitstream is output up to the computed bit plane.

Figure 13:
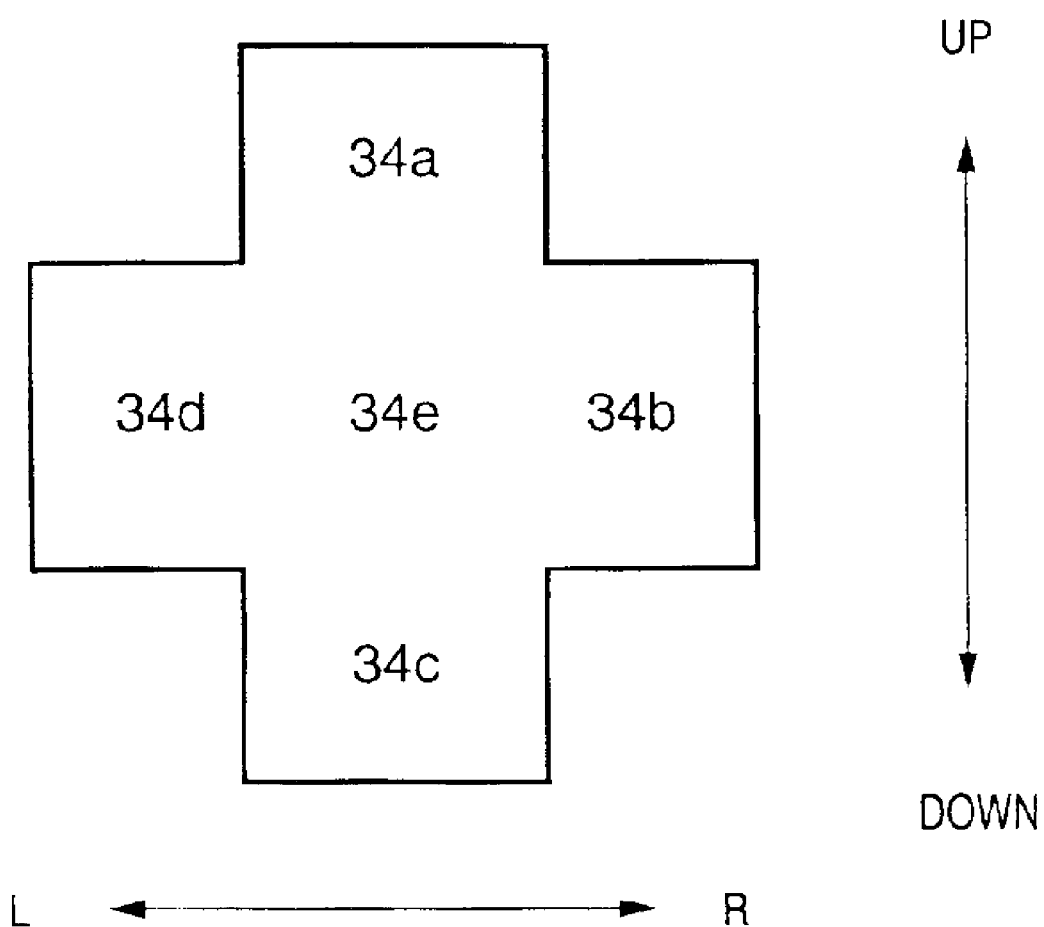
FIG. 13 is a view showing details of a region designation lever according to the first embodiment of the present invention.

A method of designating a high image quality region will be described below using FIG. 13, FIG. 14, and FIGS. 15A to 15C. FIG. 13 is a view showing details of the region designation lever according to the first embodiment of the present invention, FIG. 14 is a diagram showing details of the arrangement of a region designation lever detection circuit according to the first embodiment of the present invention, and FIGS. 15A to 15C show an example of a display image on the monitor according to the first embodiment of the present invention.

Referring to FIG. 13, reference numeral 34a denotes an upward designation lever for giving an instruction for moving a cursor upward; 34b, a rightward designation lever for giving an instruction for moving the cursor rightward; 34c, a downward designation lever for giving an instruction for moving the cursor downward; 34d, a leftward designation lever for giving an instruction for moving the cursor leftward; and 34e, a determination button for giving an instruction for determining the cursor position.

Figure 14:
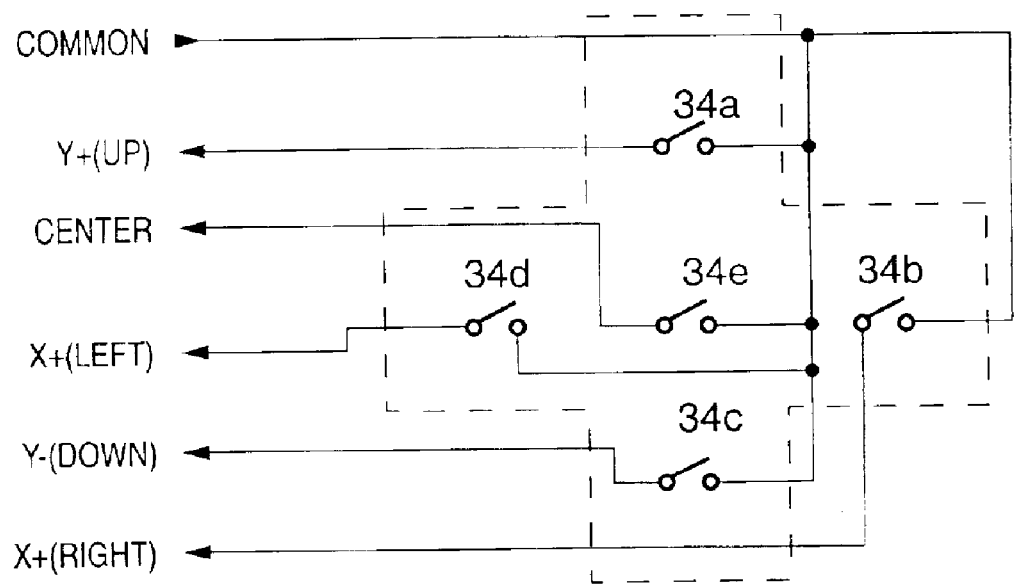
FIG. 14 is a diagram showing details of the arrangement of a region designation lever detection circuit according to the first embodiment of the present invention.
Figure 15A:
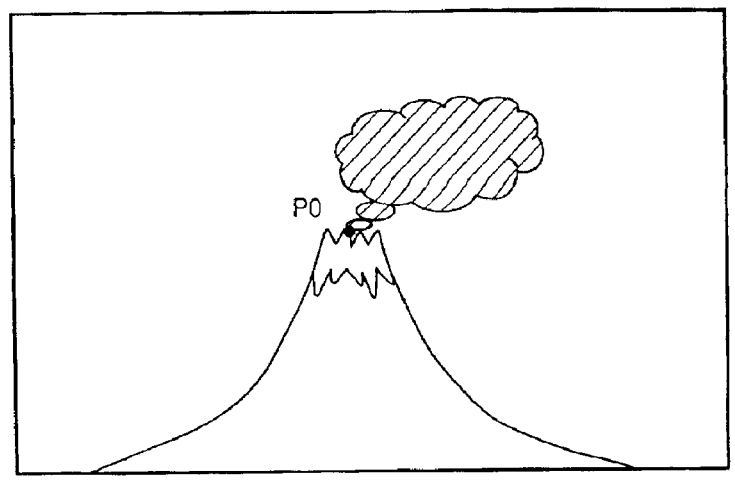
FIGS. 15A to 15C show an example of a display image on the monitor according to the first embodiment of the present invention.
Figure 15B:
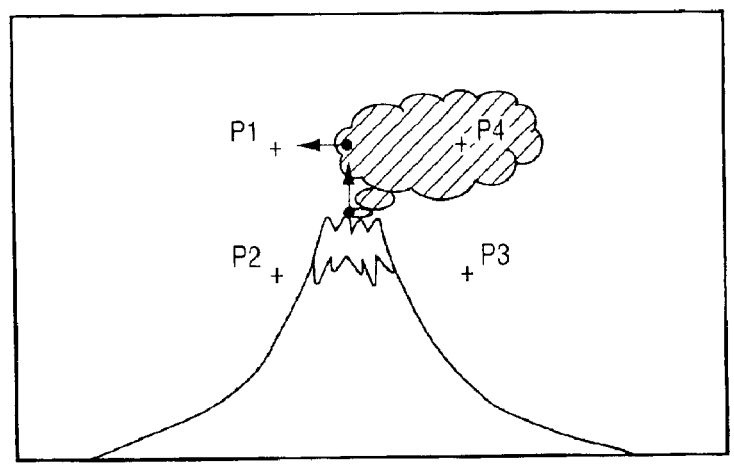
Figure 15C:
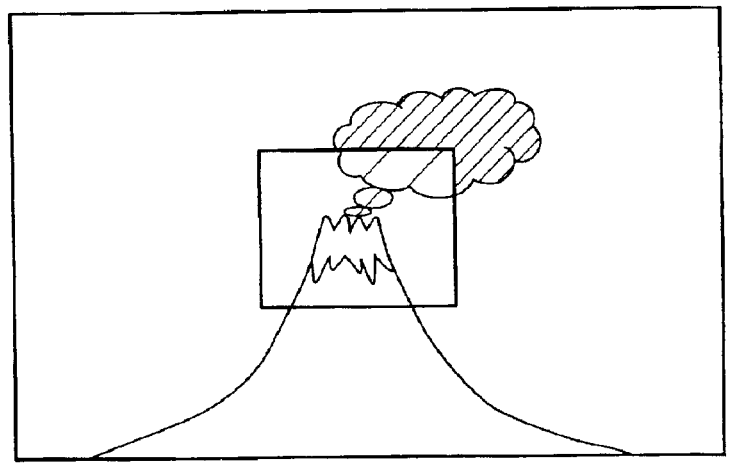

Referring to FIG. 14, reference symbol Y+ denotes an upward detection switch for sending an upward cursor movement instruction to the system controller 22 upon receiving the instruction from the upward designation lever 34a; X+, a rightward detection switch for similarly sending a rightward cursor movement instruction to the system controller 22 upon receiving the instruction from the rightward designation lever 34b; Y−, a downward detection switch for sensing a downward cursor movement instruction to the system controller 22 upon receiving the instruction from the downward designation lever 34c; X−, a leftward detection switch for sending a leftward cursor movement instruction to the system controller 22 upon receiving the instruction from the leftward designation lever 34d; and Center, a select switch for sending a cursor determination instruction to the system controller 22 upon receiving the instruction from the determination button 34e. A region can be designated by operating the levers 34a, 34b, 34c, and 34d, and the determination button 34e of the region designation lever 34.

A method of designating a high image quality region in practice will be explained below using FIGS. 15A to 15C.

Upon depression of the central determination button 34e of the region designation lever 34, a cursor P0 that designates a region is superposed on the center of the monitor 18 (FIG. 15A). The user operates the region designation lever 34 in a direction to move the cursor P0 while observing the cursor P0 displayed on the monitor 18. The system controller 22 detects the depression state of the region designation lever 34, computes the moving amount of the cursor on the basis of the detection result, and moves the cursor P0 to the computed position. Upon depression of the determination button 34e of the region designation lever 34 there, a point of a frame for forming a high image quality region is determined. In order to determine the next point, the user operates the region designation lever 34 to move the cursor P0, and repeats this operation to select four points (P1, P2, P3, P4) (FIG. 15B). When the user presses the determination button 34e again, the region defined by the selected points P1, P2, P3, and P4 is designated as the high image quality region (FIG. 15C).

Note that the difference between the designated region and another region can be confirmed at a glance by adjusting the color or luminance.

In this embodiment, the high image quality region is designated by selecting four points. Alternatively, a circle or polygon, or a specific object or person can be designated using motion information, edge components, or color components obtained by an image process or image recognition means. As a method of designating a high image quality region more accurately, a touch panel may be used.

A process executed upon zoom lever operation including operation for designating a high image quality region will be explained below using FIGS. 16A and 16B.

Figure 16A:
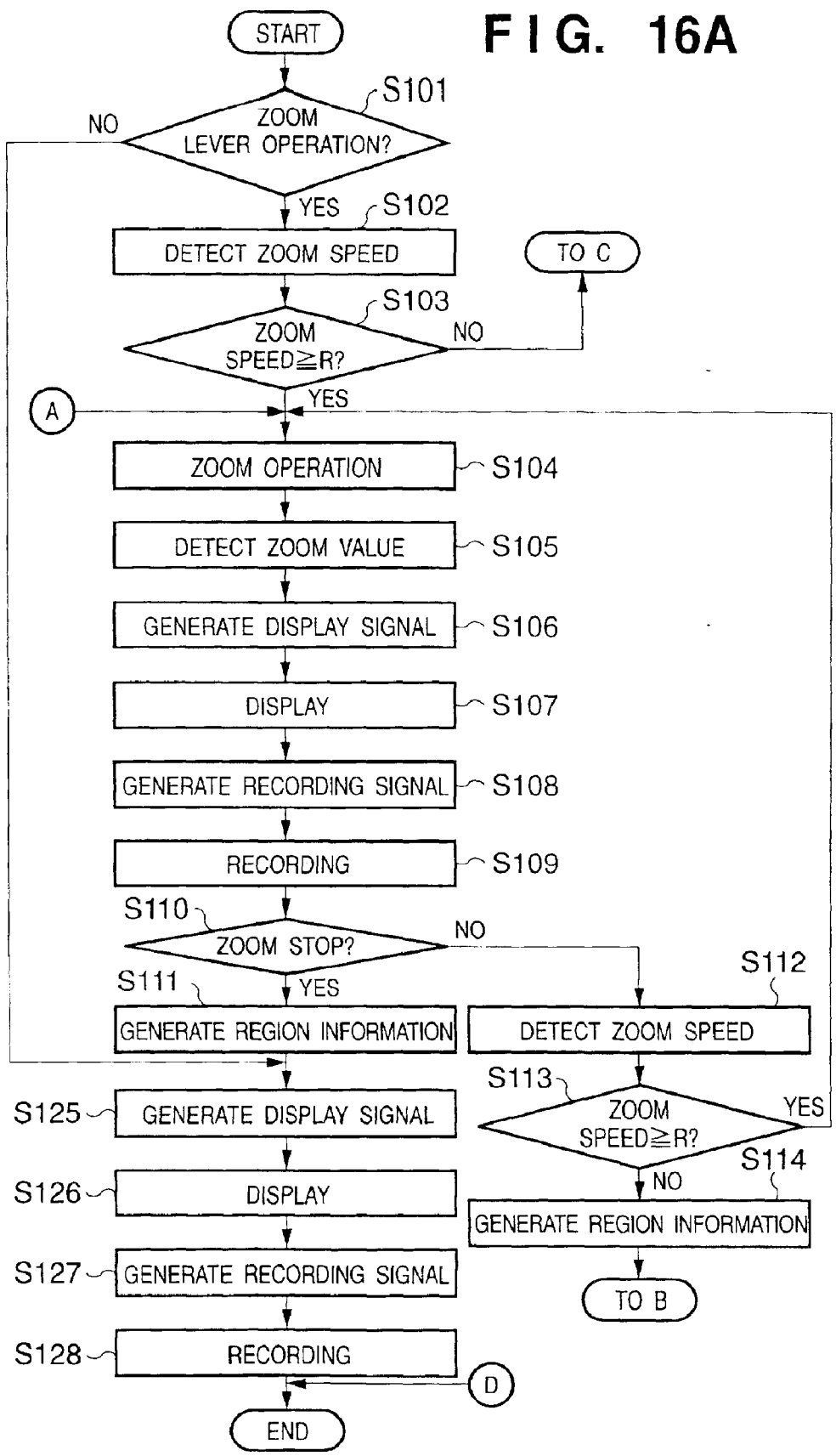
FIGS. 16A and 16B are flow charts showing a process executed upon zoom lever operation according to the first embodiment of the present invention.
Figure 16B:
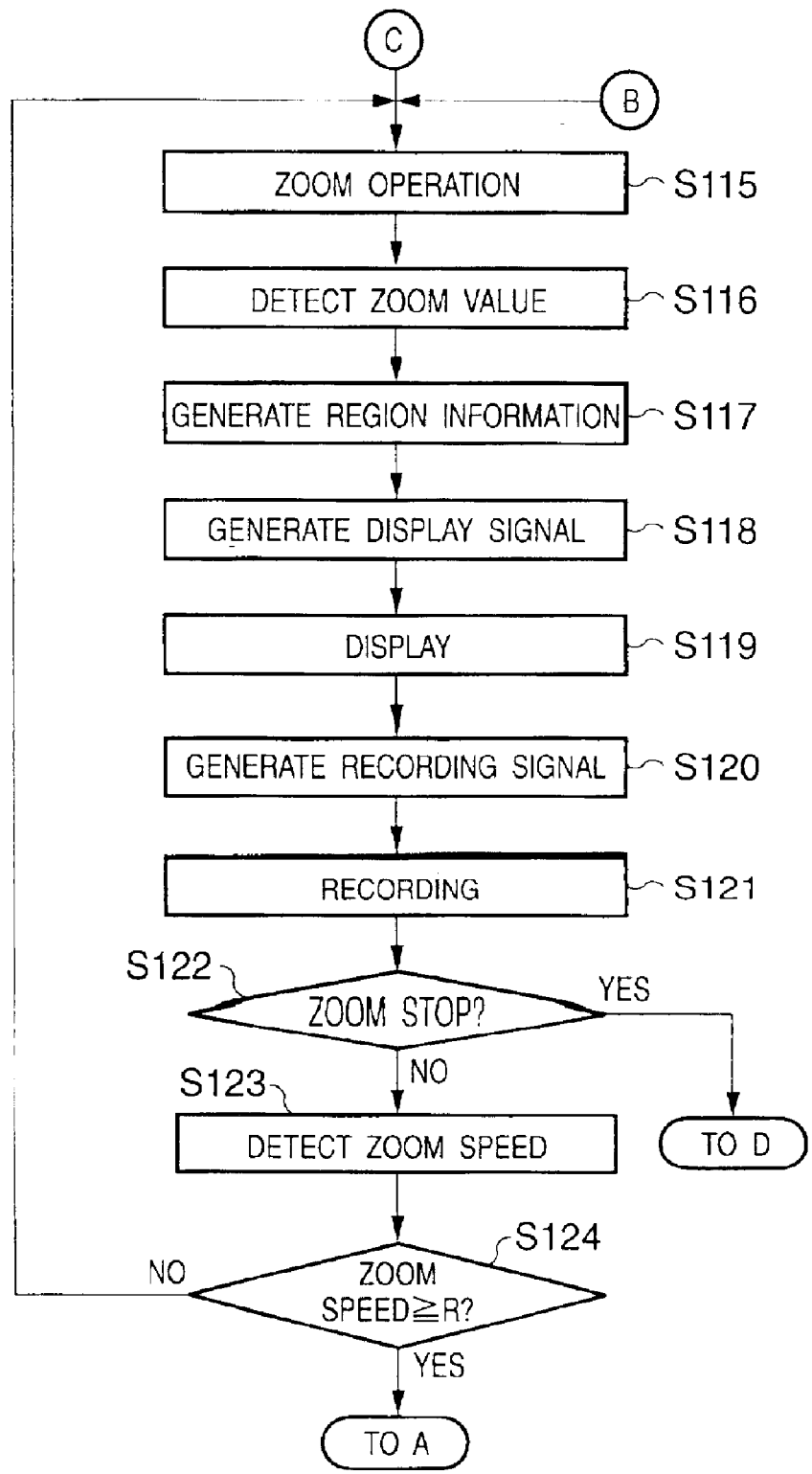

FIGS. 16A and 16B are flow charts showing a process executed upon zoom lever operation according to the first embodiment of the present invention. Note that FIGS. 16A and 16B exemplify a case wherein zoom lever operation is done after a high image quality region is determined.

It is detected in step S101 if zoom lever operation is made. If no zoom lever operation is made (NO in step S101), the flow jumps to step S125 without changing region information. In step S125, a display signal is generated by superposing the designated and non-designated regions on the basis of the region information. In step S126, the generated display signal is displayed on the monitor 18. In step S127, the designated and non-designated regions independently undergo a coding process on the basis of the region information to generate a recording signal. In step S128, the generated recording signal is recorded by the recording circuit 24, thus ending the process.

On the other hand, if zoom lever operation is made (YES in step S101), the flow advances to step S102 to compute the zoom speed based on the depression state of the zoom lever 25.

It is checked in step S103 if the zoom speed is equal to or higher than a predetermined value R. If the zoom speed is equal to or higher than the predetermined value R (YES in step S103), the flow advances to step S104. Note that the predetermined value R is a threshold value of the zoom speed to control change operation of the designated region, and can be changed according to user's favor.

In step S104, the operation state of the zoom lever 25 is detected to drive the zoom lens 11, thus performing actual zoom operation. In step S105, the moving amount of the zoom lens 11 is detected by the zoom encoder 21 to compute a zoom value. In step S106, a display signal is generated by superposing the designated and non-designated regions on the basis of the region information before zoom lever operation. In step S107, the generated display signal is displayed on the monitor 18. In step S108, the designated and non-designated regions independently undergo a coding process on the basis of the current region information to generate a recording signal. In step S109, the generated recording signal is recorded by the recording circuit 24.

In step S110, the operation state of the zoom lever 25 is detected to detect if zoom lever operation is at a stop. If zoom lever operation continues (NO in step S110), the flow advances to step S112 to detect the zoom speed. It is checked in step S113 if the zoom speed is equal to or higher than the predetermined value R. If the zoom speed is equal to or higher than the predetermined value R (YES in step S113), the flow returns to step S104 to continue actual zoom operation. On the other hand, if the zoom speed is less than the predetermined value R (NO in step S113), the flow advances to step S114 to compute the change amount of the zoom value by zoom lever operation, read out the currently stored region information from the buffer memory 16, and change the region information proportional to the change amount of the zoom value. The flow then advances to step S115.

On the other hand, if it is determined in step S110 as a result of detection of the operation state of the zoom lever 25 that zoom lever operation is at a stop (YES in step S110), the flow advances to step S111. In step S111, the change amount of the zoom value by zoom lever operation is computed, and the currently stored region information is read out from the buffer memory 16 and is changed proportional to the change amount of the zoom value. In step S125, a display signal is generated by superposing the designated and non-designated regions on the basis of the changed region information. Subsequently, the processes in steps S125 to S128 mentioned above are executed, thus ending the process.

On the other hand, if it is determined in step S103 that the zoom speed is less than the predetermined value R (NO in step S103), the flow advances to step S115. In step S115, the operation state of the zoom lever 25 is detected to drive the zoom lens 11, thus performing actual zoom operation. In step S116, the moving amount of the zoom lens 11 is detected by the zoom encoder 21 to compute a zoom value. In step S117, the change amount of the computed zoom value is computed, and the currently stored region information is read out from the buffer memory 16 and is changed in proportion to the change amount of the zoom value by zoom lever operation.

In step S118, a display signal is generated by superposing the designated and non-designated regions on the basis of the changed region information. In step S119, the display signal generated by display control circuit 32 is displayed on the monitor 18. In step S120, the designated and non-designated regions independently undergo a coding process on the basis of the changed region information to generate a recording signal. In step S121, the generated recording signal is recorded by the recording circuit 24.

In step S122, the operation state of the zoom lever 25 is detected to detect if zoom lever operation is at a stop. If zoom lever operation continues (NO in step S122), the flow advances to step S123 to detect the zoom speed. It is checked in step S124 if the zoom speed is equal to or higher than the predetermined value R. If the zoom speed is less than the predetermined value R (NO in step S124), the flow returns to step S115 to continue actual zoom operation. On the other hand, if the zoom speed is equal to or higher than the predetermined value R (YES in step S124), the flow returns to step S104 continue actual zoom operation.

On the other hand, if it is determined in step S122 as a result of detection of the operation state of the zoom lever 25 that zoom lever operation is at a stop (YES in step S122), the process ends.

An example of a change in display state on the monitor 18 upon zoom lever operation according to the first embodiment of the present invention will be described below using FIGS. 17A to 17C.

Figure 17A:
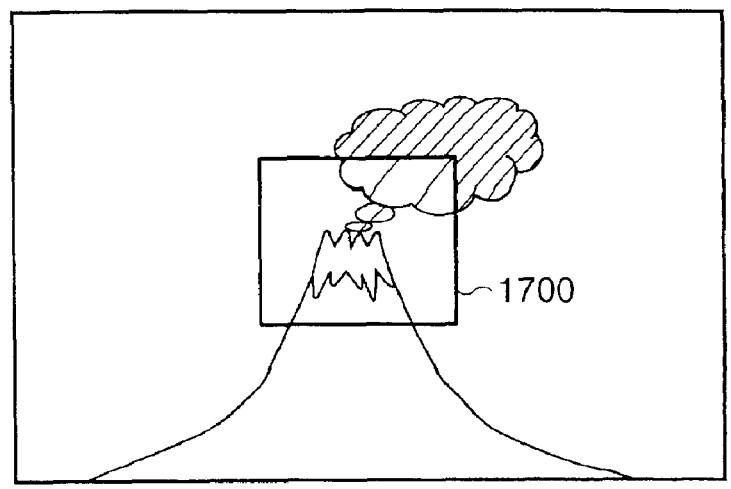
FIGS. 17A to 17C show an example of a change in display state on the monitor upon zoom lever operation according to the first embodiment of the present invention.
Figure 17B:
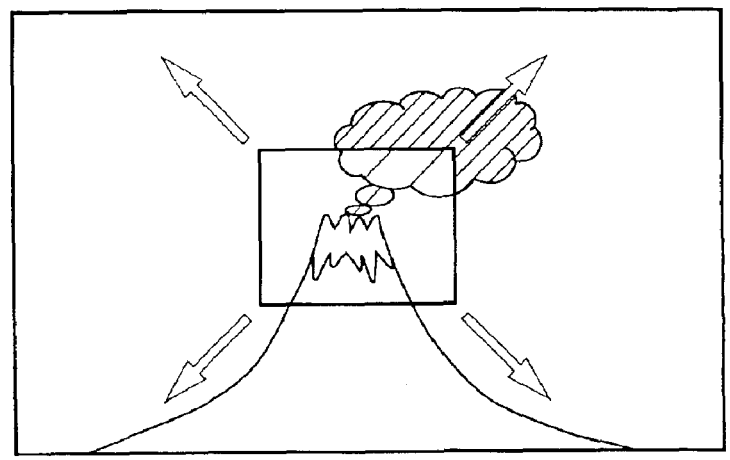
Figure 17C:
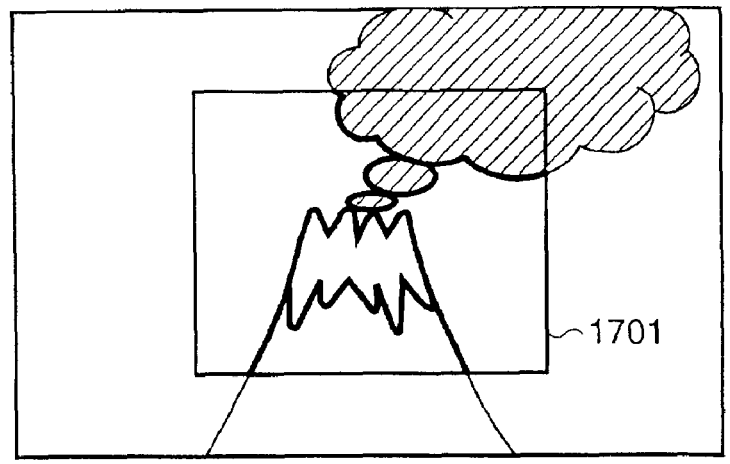

FIGS. 17A to 17C show an example of a change in display state on the monitor upon zoom lever operation according to the first embodiment of the present invention.

FIGS. 17A to 17C show a change in state on the monitor 18 when zoom lever operation is made in the telephoto direction. Especially, FIG. 17A shows a display state before zoom lever operation, FIG. 17B shows a display state indicating a change in designated region (high image quality region) during zoom lever operation, and FIG. 17C shows a display state after zoom lever operation.

When zoom lever operation is made with respect to a designated region 1700 displayed in FIG. 17A, and especially, the zoom speed is lower than the predetermined value R, the designated region changes gradually during zoom lever operation, as indicated by arrows shown in FIG. 17B, until operation comes to an end, and a designated region 1701 is generated after zoom lever operation, as shown in FIG. 17C. On the other hand, when the zoom speed is higher than the predetermined value R, a change in designated region 1700 is not displayed on the screen during zoom lever operation, and a designated region 1701 is generated after zoom lever operation, as shown in FIG. 17C.

A change in designated region along with an elapse of time upon zoom lever operation in the first embodiment will be described below using FIG. 18.

Figure 18:
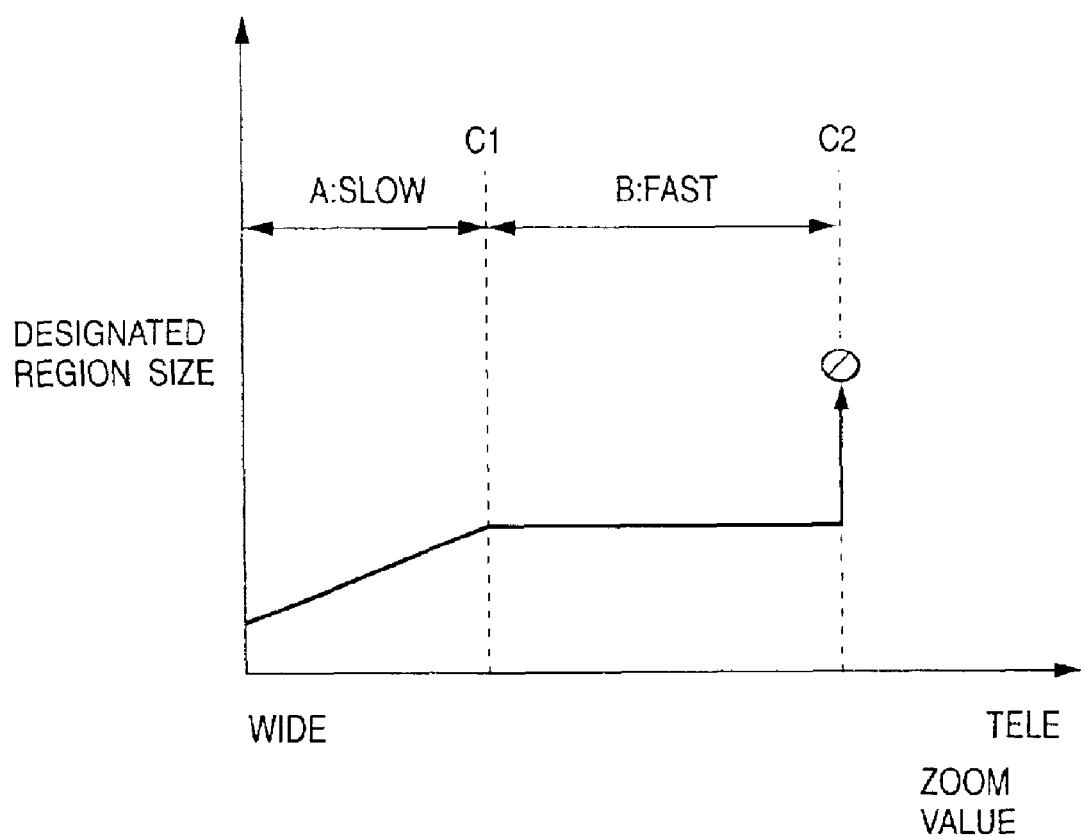
FIG. 18 is a graph showing the relationship between the zoom ratio and designated region size according to the first embodiment of the present invention.

FIG. 18 is a graph showing the relationship between the zoom ratio and designated region size in the first embodiment of the present invention.

In FIG. 18, the abscissa plots the zoom value, and the ordinate plots the size of the designated region. Period A indicates a change in designated region upon zoom lever operation when the zoom speed is lower than the predetermined value R, and period B indicates it when the zoom speed is higher than the predetermined value R. As can be seen from FIG. 18, since the zoom speed is lower than the predetermined value R during period A, the size of the designated region is updated occasionally in proportion to the change amount of the zoom ratio during zoom lever operation, upon instruction of zoom operation. When the zoom speed is set to be higher than the predetermined value R at timing C1, the region information of the designated region is not updated during zoom lever operation during period B. Upon completion of zoom lever operation at timing C1, a change amount of the zoom value between timings C1 and C2 is computed, and the size of the designated region is changed accordingly.

As described above, according to the first embodiment, a designated region in an image can be encoded to have higher image quality than the remaining region, and the designated region can be automatically controlled in accordance with the zoom speed. If the zoom speed is low, the designated region can be changed in accordance with zoom lever operation. On the other hand, if the zoom speed is high, a change in designated region is inhibited during zoom lever operation, and the designated region can be changed after completion of zoom lever operation. When the zoom speed is low, the designated region is changed in accordance with zoom lever operation, and when the zoom speed is high, a change in designated region is inhibited, and the designated region is changed after completion of zoom lever operation, thus automatically controlling the designated region in correspondence with the zoom lever operation state.

Second Embodiment

In the first embodiment, if the zoom speed is high, display and encoding processes are done without updating region information during zoom lever operation. In such case, since the region information is set, the sensed image does not match the designated region, and an unnatural image may be generated.

In the second embodiment, if the zoom speed is high, the setup of the designated region is canceled, thus avoiding an unnatural image from being generated due to a mismatch between the sensed image and designated region.

Since the arrangement of the image sensing apparatus is the same as that in the first embodiment, a detailed description thereof will be omitted, and a process executed upon zoom lever operation according to the second embodiment will be explained below using FIGS. 19A and 19B.

Figure 19A:
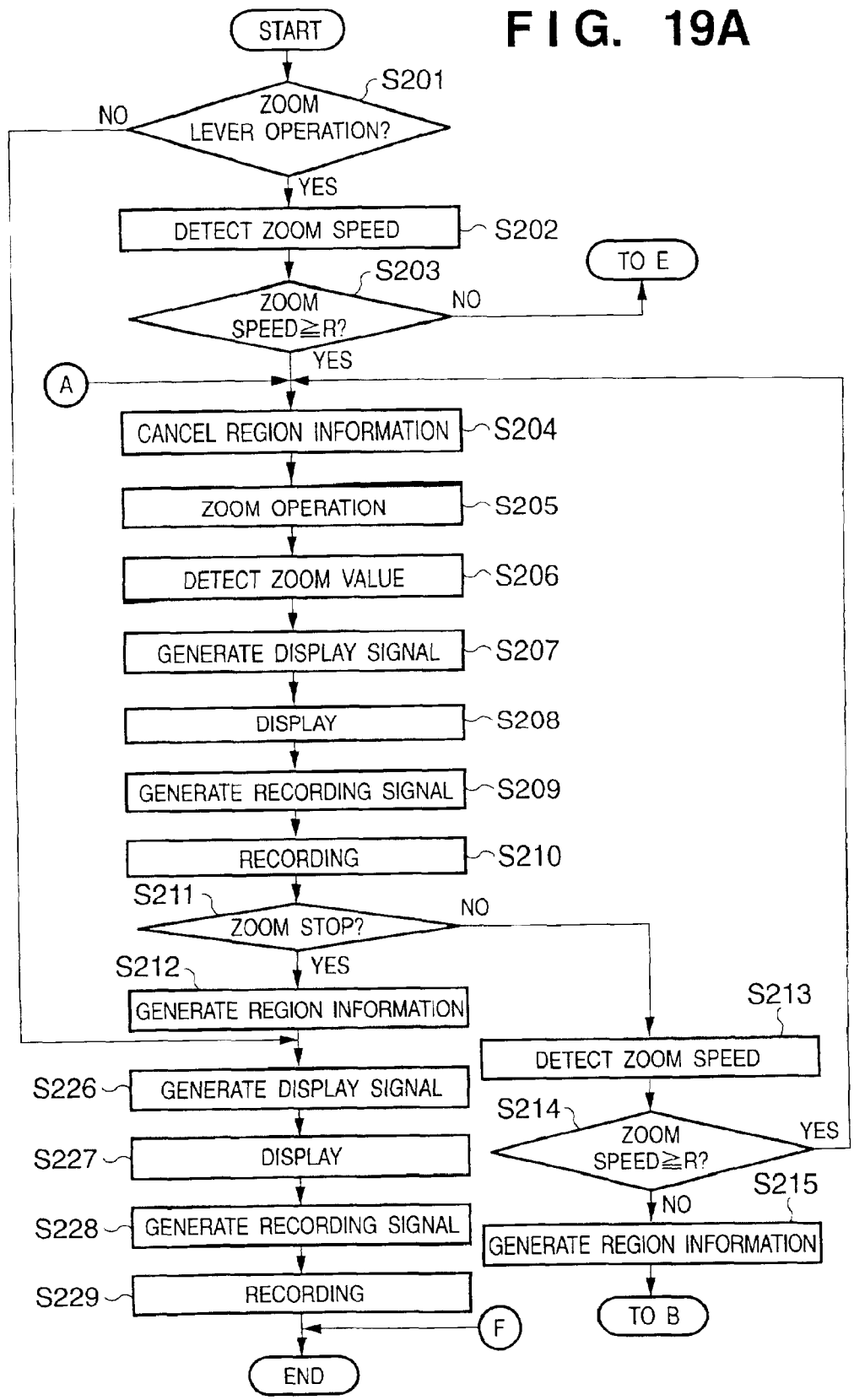
FIGS. 19A and 19B are flow charts showing a process executed upon zoom lever operation according to the second embodiment of the present invention.
Figure 19B:
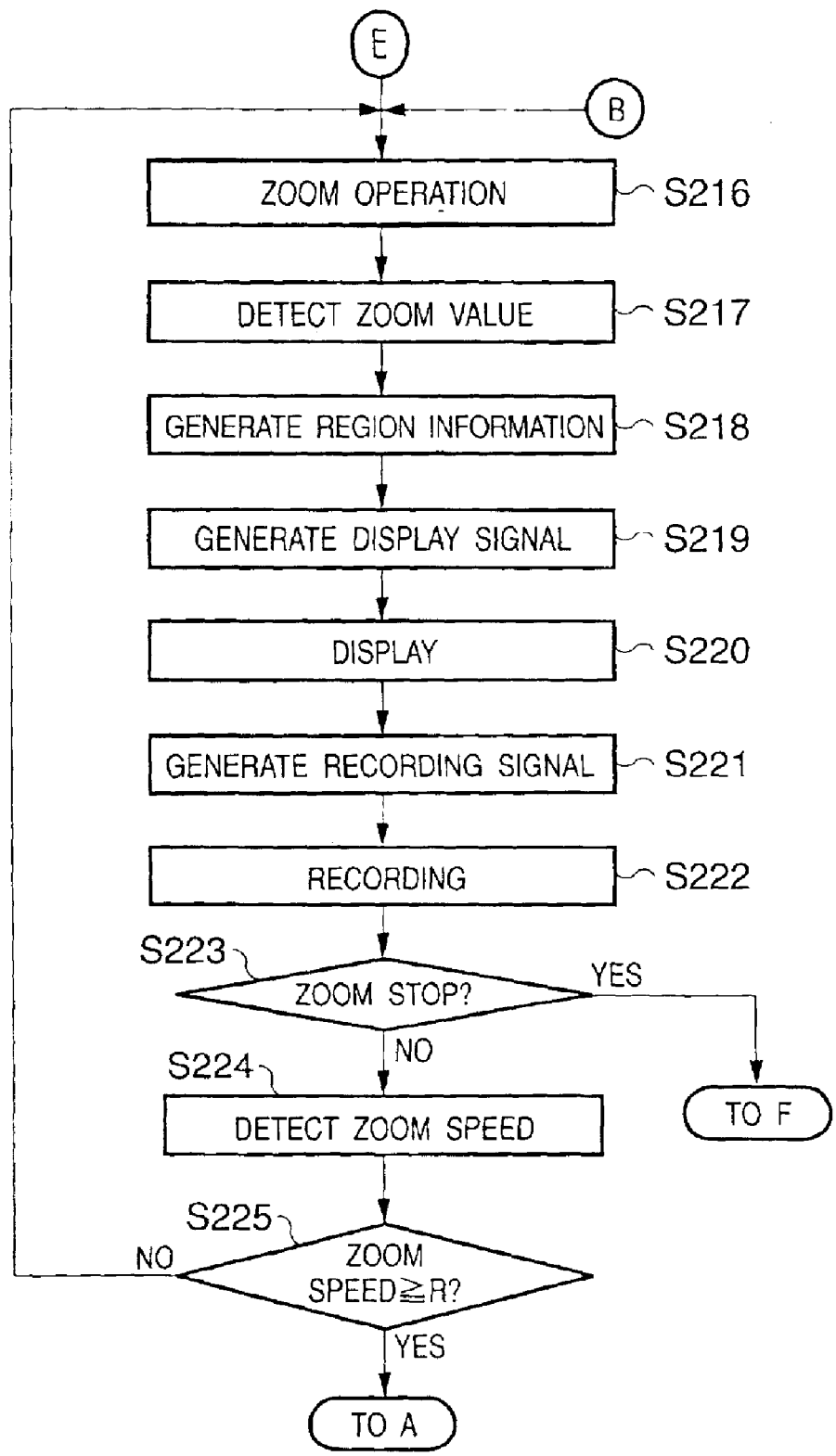

FIGS. 19A and 19B are flow charts showing a process executed upon zoom lever operation according to the second embodiment of the present invention.

It is detected in step S201 if zoom lever operation is made. If no zoom lever operation is made (NO in step S201), the flow jumps to step S226 without changing region information. Since the processes in steps S226 to S229 are the same as those in steps S125 to S128 in FIGS. 16A and 16B of the first embodiment, a description thereof will be omitted.

On the other hand, if zoom lever operation is made (YES in step S201), the flow advances to step S202 to compute the zoom speed based on the depression state of the zoom lever 25.

If the zoom speed is equal to or higher than the predetermined value R in step S203 (YES in step S203), the flow advances to step S204 to cancel the currently set region information.

In step S205, the operation state of the zoom lever 25 is detected to drive the zoom lens 11, thus performing actual zoom operation. In step S206, the moving amount of the zoom lens 11 is detected by the zoom encoder 21 to compute a zoom value. In step S207, a display signal is generated using the entire sensed image as a non-designated region. In step S208, the generated display signal is displayed on the monitor 18. In step S209, the entire sensed image undergoes a coding process as a non-designated region to generate a recording signal. In step S210, the generated recording signal is recorded by the recording circuit 24.

In step S211, the operation state of the zoom lever 25 is detected to detect if zoom lever operation is at a stop. If zoom lever operation continues (NO in step S211), the flow advances to step S213 to detect the zoom speed. It is checked in step S214 if the zoom speed is equal to or higher than the predetermined value R. If the zoom speed is equal to or higher than the predetermined value R (YES in step S214), the flow returns to step S205 to continue actual zoom operation. On the other hand, if the zoom speed is less than the predetermined value R (NO in step S214), the flow advances to step S215 to compute the change amount of the zoom value by zoom lever operation, read out the currently stored region information from the buffer memory 16, and change the region information proportional to the change amount of the zoom value. The flow then advances to step S216.

On the other hand, if it is determined in step S212 as a result of detection of the operation state of the zoom lever 25 that zoom lever operation is at a stop (YES in step S211), the flow advances to step S213. In step S213, the change amount of the zoom value by zoom lever operation is computed, and the currently stored region information is read out from the buffer memory 16 and is changed proportional to the change amount of the zoom value. The changed region information is stored again in the buffer memory 16. Then, the processes in steps S226 to S229 mentioned above are executed, thus ending the process.

On the other hand, if it is determined in step S203 that the zoom speed is less than the predetermined value R (NO in step S203), the flow advances to step S216. Since the processes in steps S216 to S225 are the same as those in steps S115 to S124 in FIGS. 16A and 16B of the first embodiment, a description thereof will be omitted.

An example of a change in display state on the monitor 18 upon zoom lever operation according to the second embodiment of the present invention will be described below using FIGS. 20A to 20C.

Figure 20A:
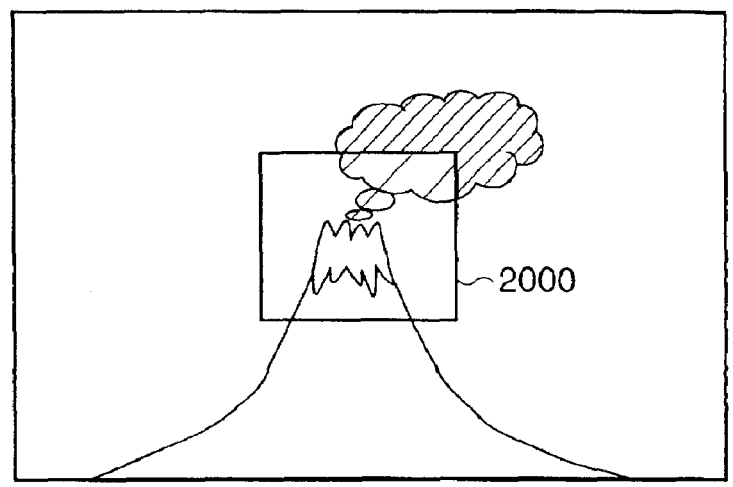
FIGS. 20A to 20C show an example of a change in display state on a monitor according to the second embodiment of the present invention.
Figure 20B:
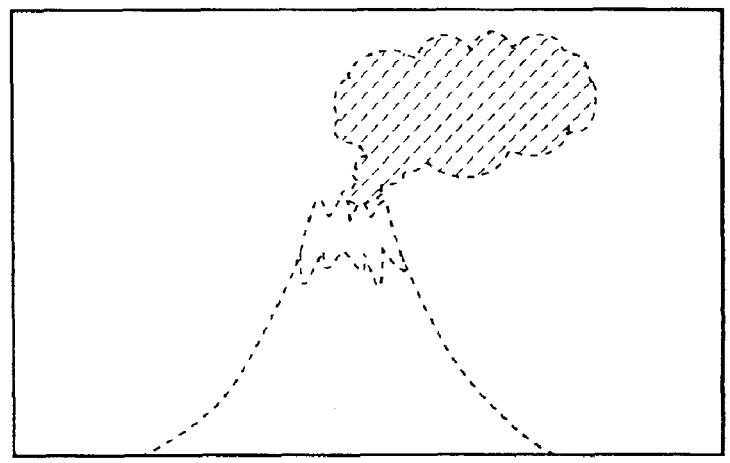
Figure 20C:
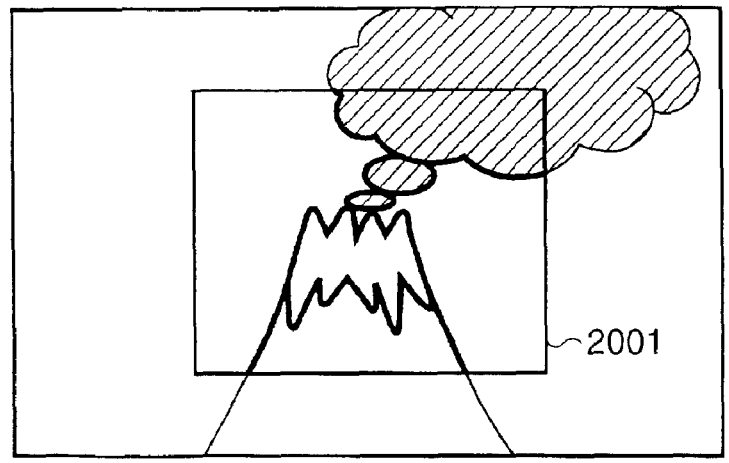

FIGS. 20A to 20C show an example of a change in display state on the monitor upon zoom lever operation according to the second embodiment of the present invention.

FIGS. 20A to 20C show a change in state on the monitor 18 when zoom lever operation is made in the telephoto direction. Especially, FIG. 20A shows a display state before zoom lever operation, FIG. 20B shows a display state indicating a change in designated region (high image quality region) during zoom lever operation, and FIG. 20C shows a display state after zoom lever operation.

When the zoom speed is higher than the predetermined value R with respect to a designated region 2000 displayed in FIG. 20A, the set region information is canceled, and only a sensed image is displayed without displaying any designated region 2000 during zoom lever operation, as shown in FIG. 20B. Upon completion of zoom lever operation, the designated information is changed, and a designated region 2001 is generated to be superposed on the sensed image, as shown in FIG. 20C.

A change in designated region along with an elapse of time upon zoom lever operation in the second embodiment will be described below using FIG. 21.

Figure 21:
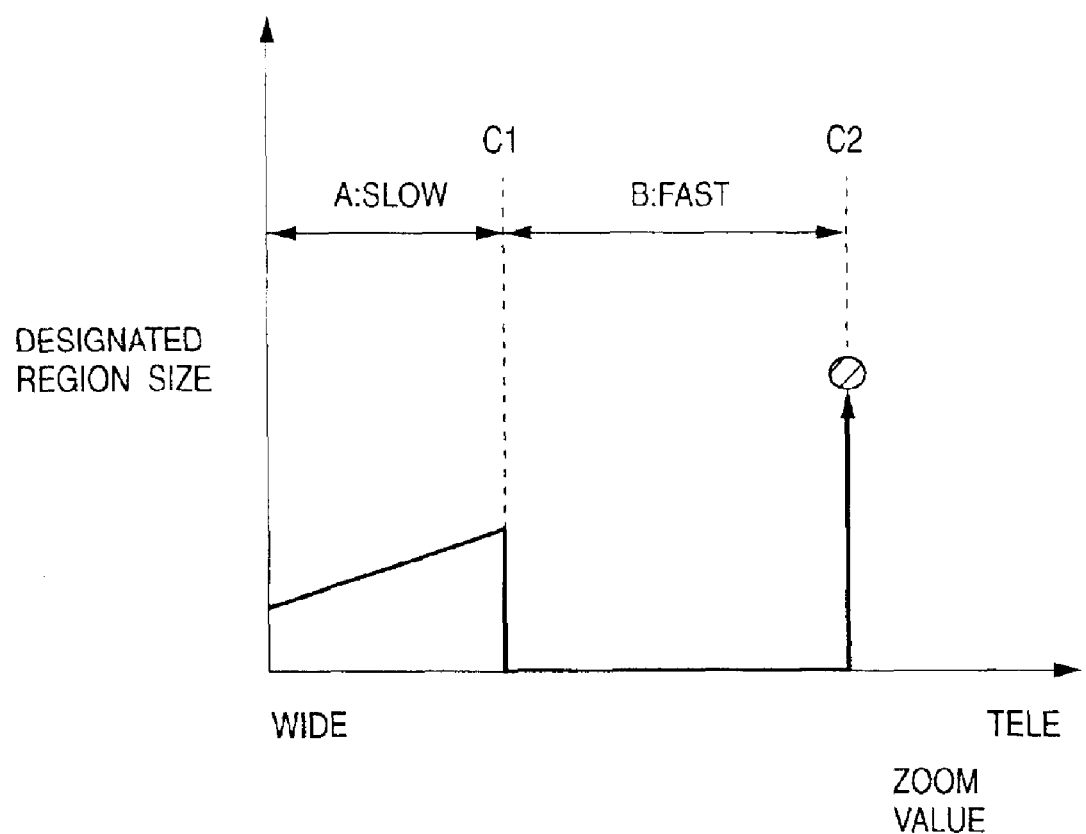
FIG. 21 is a graph showing the relationship between the zoom ratio and designated region size according to the second embodiment of the present invention.

FIG. 21 is a graph showing the relationship between the zoom ratio and designated region size in the second embodiment of the present invention.

In FIG. 21, the abscissa plots the zoom value, and the ordinate plots the size of the designated region. Period A indicates a change in designated region upon zoom lever operation when the zoom speed is lower than the predetermined value R, and period B indicates it when the zoom speed is higher than the predetermined value R. As can be seen from FIG. 21, since the zoom speed is lower than the predetermined value R during period A, the size of the designated region is updated occasionally in proportion to the change amount of the zoom ratio during zoom lever operation, upon instruction of zoom operation. When the zoom speed is set to be higher than the predetermined value R at timing C1, the region information of the designated region is canceled during zoom lever operation during period B. Upon completion of zoom lever operation at timing C1, a change amount of the zoom value between timings C1 and C2 is computed, and the size of the designated region is changed accordingly.

As described above, a change in designated region (high image quality region) can be controlled in accordance with the zoom speed, and the display and compression processes can be changed accordingly.

As described above, according to the second embodiment, a designated region in an image can be encoded to have higher image quality than the remaining region, and when the zoom speed is high, the set designated region is canceled during zoom lever operation, and the changed designated region can be set after completion of zoom lever operation. In this manner, an unnatural image can be prevented from being generated due to a mismatch between the sensed image and designated region during zoom lever operation.

Third Embodiment

Figure 22:
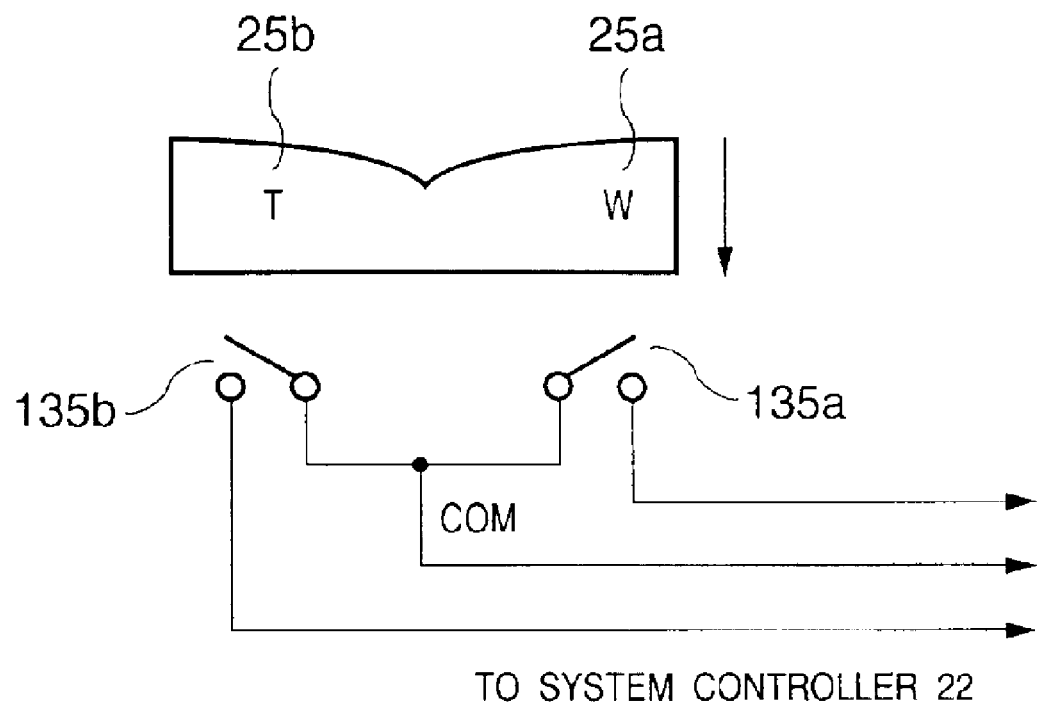
FIG. 22 is a diagram showing details of the arrangement of a zoom lever detection circuit according to the third embodiment of the present invention.

FIG. 22 is a diagram showing details of the arrangement of the zoom lever detection circuit according to the third embodiment of the present invention.

Note that the image sensing apparatus (e.g., a video camera) of this embodiment can sense a moving image or (and) still image. The same reference numerals denote the same building components as those in the image sensing apparatus of the first embodiment shown in FIG. 10, and a detailed description of building components having the same functions will be omitted.

Zoom operation of the image sensing apparatus-in the third embodiment will be explained below.

The image sensing apparatus in the third embodiment can attain zoom operation by operating the zoom lever 25.

Practical operation will be explained below using FIG. 22.

Upon depression of the wide switch 25a, a wide instruction detector 135a in the zoom lever detection circuit 35 detects the depression state of the wide switch 25a and sends a reduction instruction to the system controller 22. Likewise, upon depression of the tele switch 25b, a tele instruction detector 135b in the zoom lever detection circuit 35 detects the depression state of the tele switch 25b and sends an enlargement instruction to the system controller 22.

Based on such information, the system controller 22 instructs the zoom driver 20b to enlarge/reduce so as to control rotation of the zoom motor 20a, thus moving the zoom lens 11. The focus motor driver 19b controls the focus motor 19a on the basis of in-focus curve information in the cam table 39 corresponding to the set zoom value, thus moving the focus lens 12.

A process executed upon zoom lever operation including operation for designating a high image quality region will be explained below using FIG. 23.

Figure 23:
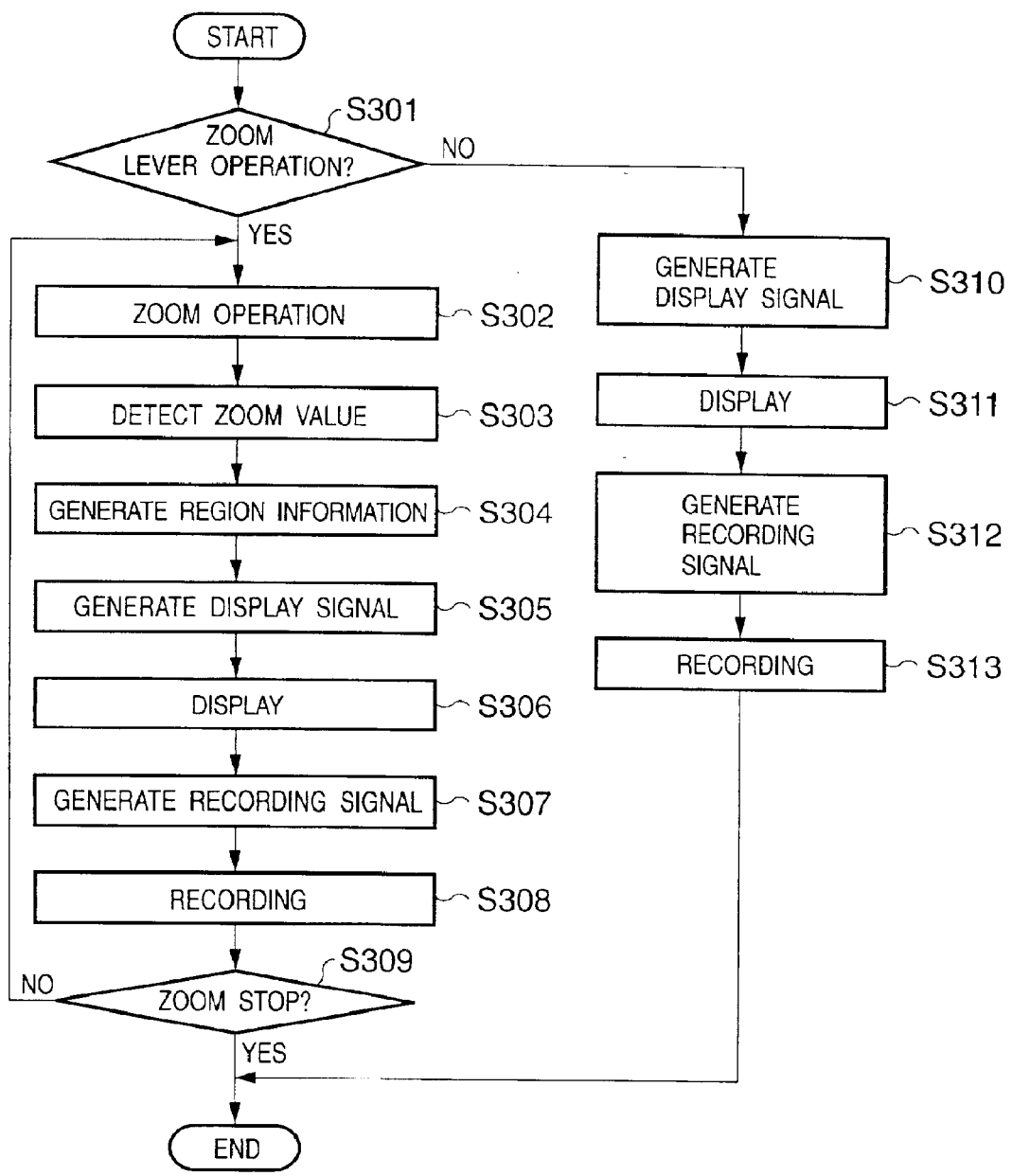
FIG. 23 is a flow chart showing a process executed upon zoom lever operation according to the third embodiment of the present invention.

FIG. 23 is a flow chart showing a process executed upon zoom lever operation according to the third embodiment of the present invention. Note that FIG. 23 exemplifies a case wherein zoom lever operation is done after the high image quality region is determined.

It is detected in step S301 if zoom lever operation is made. If no zoom lever operation is made (NO in step S301), the flow advances to step S310 without changing region information. In step S310, a display signal is generated by superposing the designated and non-designated regions on the basis of the region information. In step S311, the generated display signal is displayed on the monitor 18. In step S312, the designated and non-designated regions independently undergo a coding process on the basis of the region information to generate a recording signal. In step S313, the generated recording signal is recorded by the recording circuit 24, thus ending the process.

On the other hand, if zoom lever operation is made (YES in step S301), the flow advances to step S302 to detect the operation state of the zoom lever 25 to drive the zoom lens 11, thus performing actual zoom operation. In step S303, the moving amount of the zoom lens 11 is detected by the zoom encoder 21 to compute a zoom value. In step S304, the change amount of the zoom value by zoom lever operation is computed, and the region information is changed proportional to the change amount of the zoom value. In step S305, a display signal is generated by superposing the designated and non-designated regions on the basis of the changed region information. In step S306, the generated display signal is displayed on the monitor 18. In step S307, the designated and non-designated regions independently undergo a coding process on the basis of the region information to generate a recording signal. In step S308, the generated recording signal is recorded by the recording circuit 24.

In step S309, the operation state of the zoom lever 25 is detected to detect if zoom lever operation is at a stop. If zoom lever operation continues (NO in step S309), the flow returns to step S302 to continue actual zoom operation.

On the other hand, if it is determined in step S309 as a result of detection of the operation state of the zoom lever 25 that zoom lever operation is at a stop (YES in step S309), the process ends.

An example of a change in display state on the monitor 18 upon zoom lever operation according to the third embodiment of the present invention will be described below using FIGS. 24A to 24C. Also, a change in designated region along with an elapse-of time upon zoom lever operation in the third embodiment will be explained below using FIG. 25.

Figure 24A:
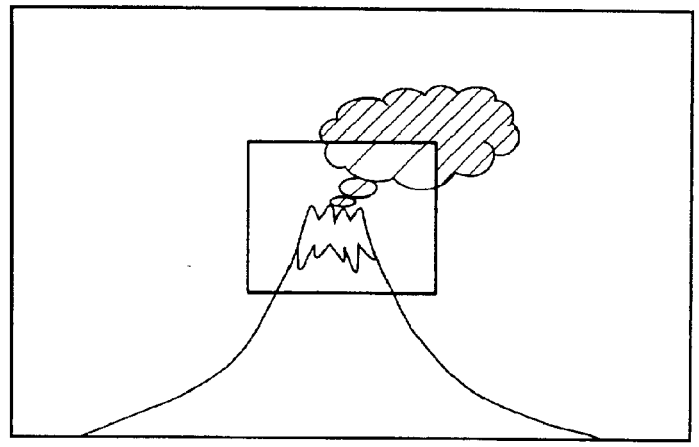
FIGS. 24A to 24C show an example of a change in display state on a monitor upon zoom lever operation according to the third embodiment of the present invention.
Figure 24B:
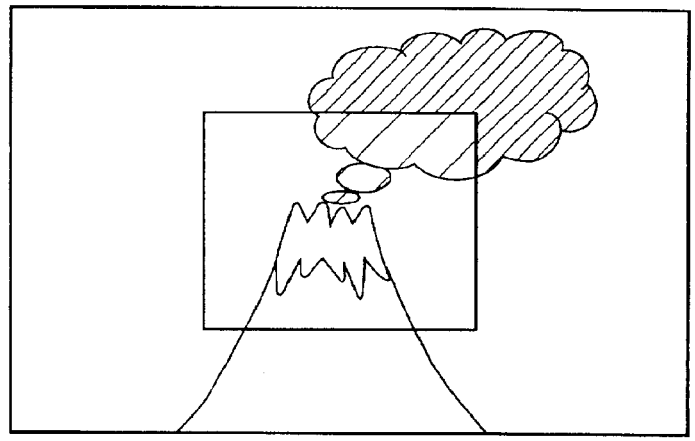
Figure 24C:
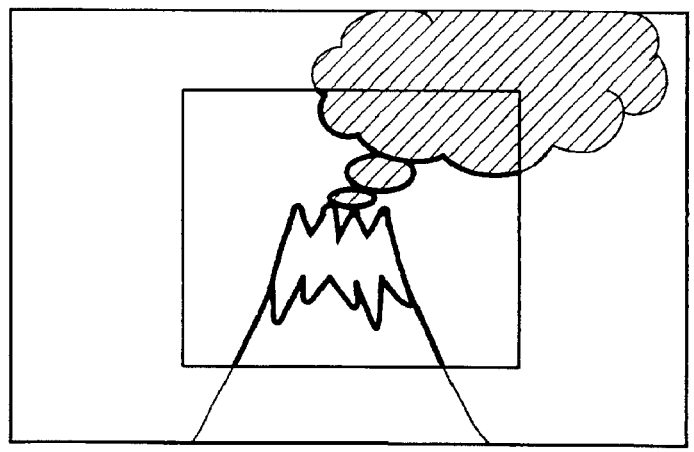
Figure 25:
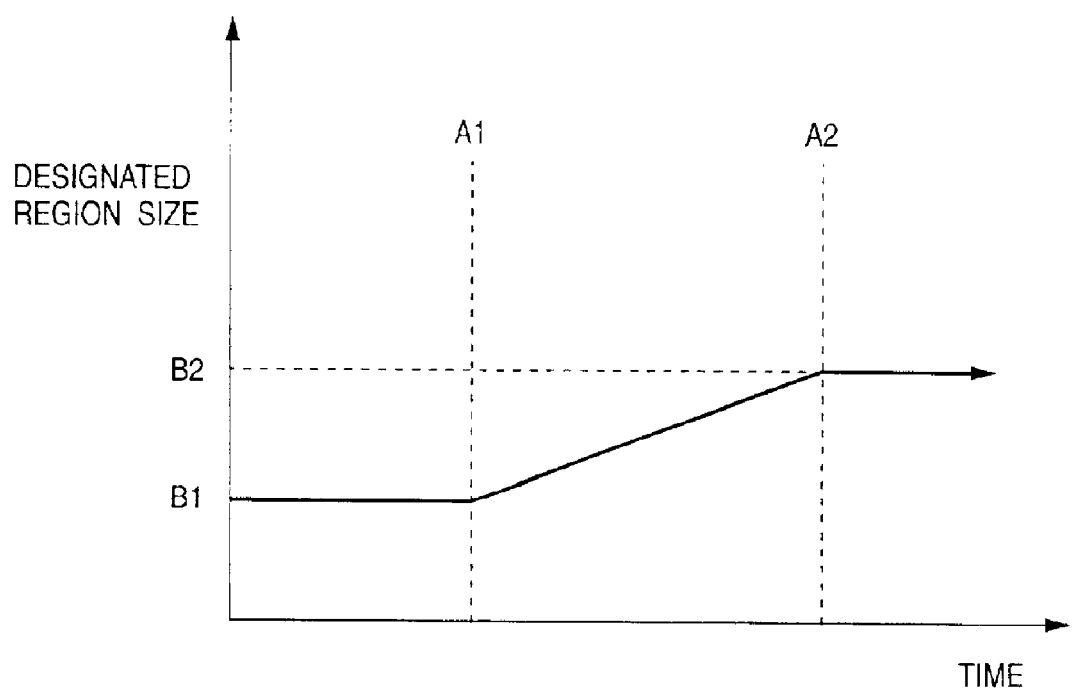
FIG. 25 is a graph showing the relationship between the time and designated region size according to the third embodiment of the present invention.

FIGS. 24A to 24C show an example of a change in display state on the monitor upon zoom lever operation according to the third embodiment of the present invention, and FIG. 25 is a graph showing the relationship between time and designated region size in the third embodiment of the present invention.

FIGS. 24A to 24C show a change in state on the monitor 18 when zoom lever operation is made in the telephoto direction. Especially, FIG. 24A shows a display state before zoom lever operation, FIG. 24B shows a display state indicating a change in designated region (high image quality region) during zoom lever operation, and FIG. 24C shows a display state after zoom lever operation. In FIG. 25, the abscissa plots the time, and the ordinate plots the size of the designated region. Also, A1 indicates the instruction timing of the zoom lever 25, A2 the instruction cancel timing of the zoom lever, B1 the size of the designated region before zoom lever operation, and B2 the size of the designated region after zoom lever operation.

As can be seen from FIGS. 24A to 24C and FIG. 25, the size of the designated region is set to be B1 before zoom lever operation. Upon receiving an enlargement instruction at the timing A1 (from A1 to A2), the size of the designated region is gradually enlarged together with the sensed image in accordance with a change in zoom value during zoom lever operation. When the enlargement instruction is canceled at the timing A2, it is determined that zoom lever operation is complete, and B2 as the size of the region set at the timing A2 is set as that of the designated region.

As described above, according to the third embodiment, a designated region in an image can be encoded to have higher image quality than the remaining region, and the designated region can be automatically controlled in accordance with zoom lever operation.

Fourth Embodiment

In the third embodiment, the designated region is changed in accordance with zoom lever operation. However, for example, when the object to be sensed moves fast, an unnatural image or an object image that the user did not intend may be sensed if the designated region is changed in accordance with zoom lever operation. To combat this problem, the fourth embodiment will explain an arrangement in which the display and coding processes are done without updating the region information during zoom lever operation.

Since the arrangement of the image sensing apparatus is the same as that in the third embodiment, a detailed description thereof will be omitted, and a process executed upon zoom lever operation according to the fourth embodiment will be explained below using FIG. 26.

Figure 26:
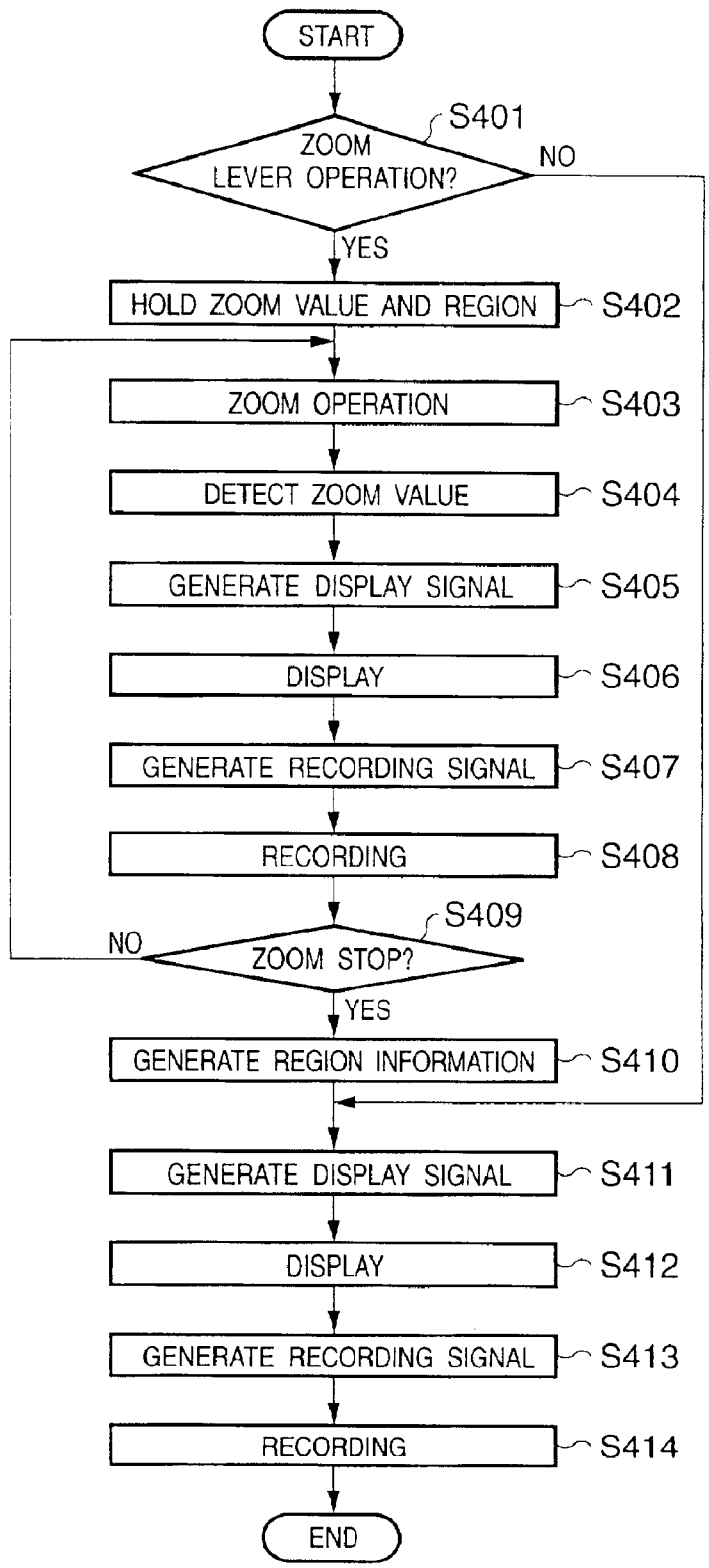
FIG. 26 is a flow chart showing a process executed upon zoom lever operation according to the fourth embodiment of the present invention.

FIG. 26 is a flow chart showing a process executed upon zoom lever operation according to the fourth embodiment of the present invention.

It is detected in step S401 if zoom lever operation is made. If no zoom lever operation is made (NO in step S401), the flow jumps to step S411 without changing region information. Since the processes in step S411 to S414 are the same as those in steps S310 to S313 in FIG. 23, a description thereof will be omitted.

On the other hand, if zoom lever operation is made (YES in step S401), the flow advances to step S402 to hold the region information and zoom value before zoom lever operation. In step S403, the operation state of the zoom lever 25 is detected to drive the zoom lens 11, thus performing actual zoom operation. In step S404, the moving amount of the zoom lens 11 is detected by the zoom encoder 21 to compute a zoom value. In step S405, a display signal is generated by superposing the designated and non-designated regions on the basis of the region information before zoom lever operation. In step S406, the generated display signal is displayed on the monitor 18. In step S407, the designated and non-designated regions independently undergo a coding process on the basis of the region information before zoom lever operation to generate a recording signal. In step S408, the generated recording signal is recorded by the recording circuit 24.

In step S409, the operation state of the zoom lever 25 is detected to detect if zoom lever operation is at a stop. If zoom lever operation continues (NO in step S409), the flow returns to step S403 to continue actual zoom operation.

On the other hand, if it is determined in step S409 as a result of detection of the operation state of the zoom lever 25 that zoom lever operation is at a stop (YES in step S409), the flow advances to step S410.

In step S410, the change amount of the zoom value by zoom lever operation is computed, and the region information is changed proportional to the change amount of the zoom value to generate new region information. In step S411, a display signal is generated by superposing the designated and non-designated regions on the basis of the changed region information. In step S412, the generated display signal is displayed on the monitor 18. In step S413, the designated and non-designated regions independently undergo a coding process on the basis of the changed region information to generate a recording signal. In step S414, the generated recording signal is recorded by the recording circuit 24, thus ending the process.

An example of a change in display state on the monitor 18 upon zoom lever operation according to the fourth embodiment will be described below using FIGS. 27A to 27C. Also, a change in designated region along with an elapse of time upon zoom lever operation in the fourth embodiment will be explained below using FIG. 28.

Figure 27A:
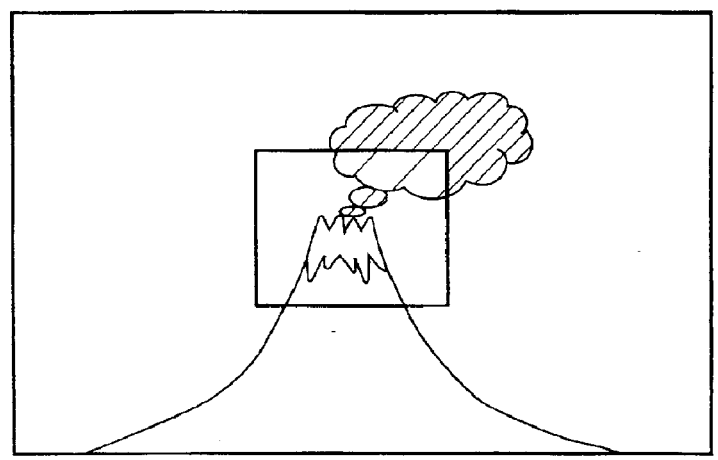
FIGS. 27A to 27C show an example of a change in display state on the monitor upon zoom lever operation according to the fourth embodiment of the present invention.
Figure 27B:
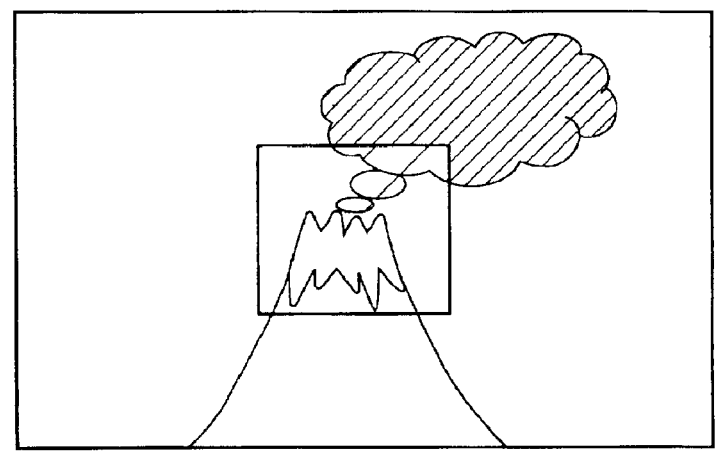
Figure 27C:
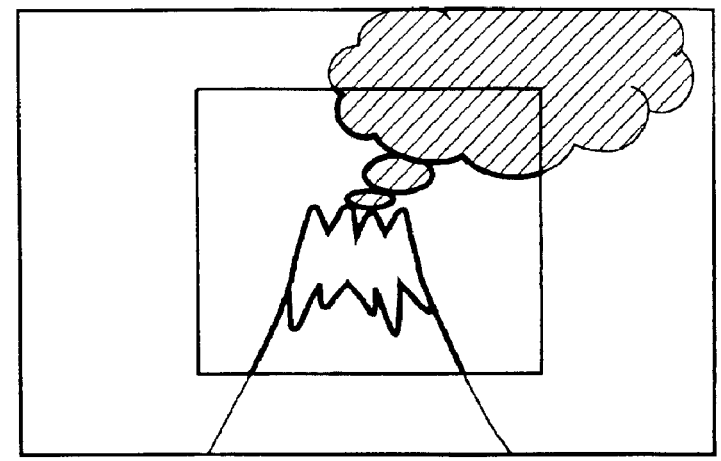
Figure 28:
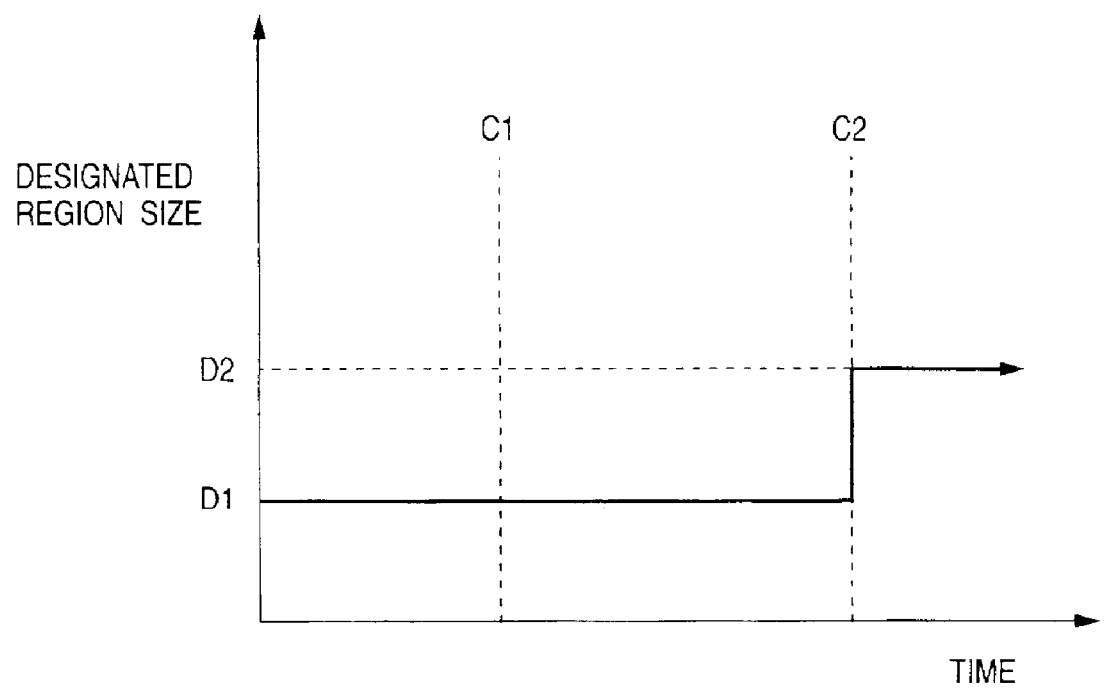
FIG. 28 is a graph showing the relationship between the time and designated region size according to the fourth embodiment of the present invention.

FIGS. 27A to 27C show an example of a change in display state on the monitor upon zoom lever operation according to the fourth embodiment of the present invention, and FIG. 28 is a graph showing the relationship between the time and designated region size in the fourth embodiment of the present invention.

FIGS. 27A to 27C show a change in state on the monitor 18 when zoom lever operation is made in the telephoto direction. Especially, FIG. 27A shows a display state before zoom lever operation, FIG. 27B shows a display state indicating a change in designated region (high image quality region) during zoom lever operation, and FIG. 27C shows a display state after zoom lever operation. In FIG. 28, the abscissa plots time, and the ordinate plots the size of the designated region. Also, C1 indicates the instruction timing of the zoom lever 25, C2 the instruction cancel timing of the zoom lever, D1 the size of the designated region before zoom lever operation, and D2 the size of the designated region after zoom lever operation.

As can be seen from FIGS. 27A to 27C and FIG. 28, the size of the designated region is set to be D1 before zoom lever operation. Upon receiving an enlargement instruction at the timing C1, the size of the designated region is fixed. During zoom lever operation (from C1 to C2), the sensed image is enlarged in accordance with the zoom value but is displayed with fixed designated region. When the enlargement instruction is canceled at the timing C2, it is determined that zoom lever operation is complete, and new region information D2 is generated based on the zoom change amount before and after zoom lever operations, is set as the size of the designated region and is superposed on the sensed image.

As described above, according to the fourth embodiment, a designated region in an image can be encoded to have higher image quality than the remaining region. In addition, during zoom lever operation, the region information of the designated region before operation is held, and the designated region remains unchanged. Upon completion of zoom lever operation, the designated region can be automatically changed proportional to the change amount of the zoom value before and after zoom lever operation.

Fifth Embodiment

In the third and fourth embodiments, the designated and non-designated regions are independently processed even during zoom lever operation. However, during zoom lever operation, a stable image cannot often be supplied (e.g., the sensed image may be blurred). To solve this problem, the fifth embodiment will explain an arrangement in which the setup of the designated region is canceled during zoom lever operation.

Since the arrangement of the image sensing apparatus is the same as that in the third embodiment, a detailed description thereof will be omitted, and a process executed upon zoom lever operation according to the fifth embodiment will be explained below using FIG. 29.

Figure 29:
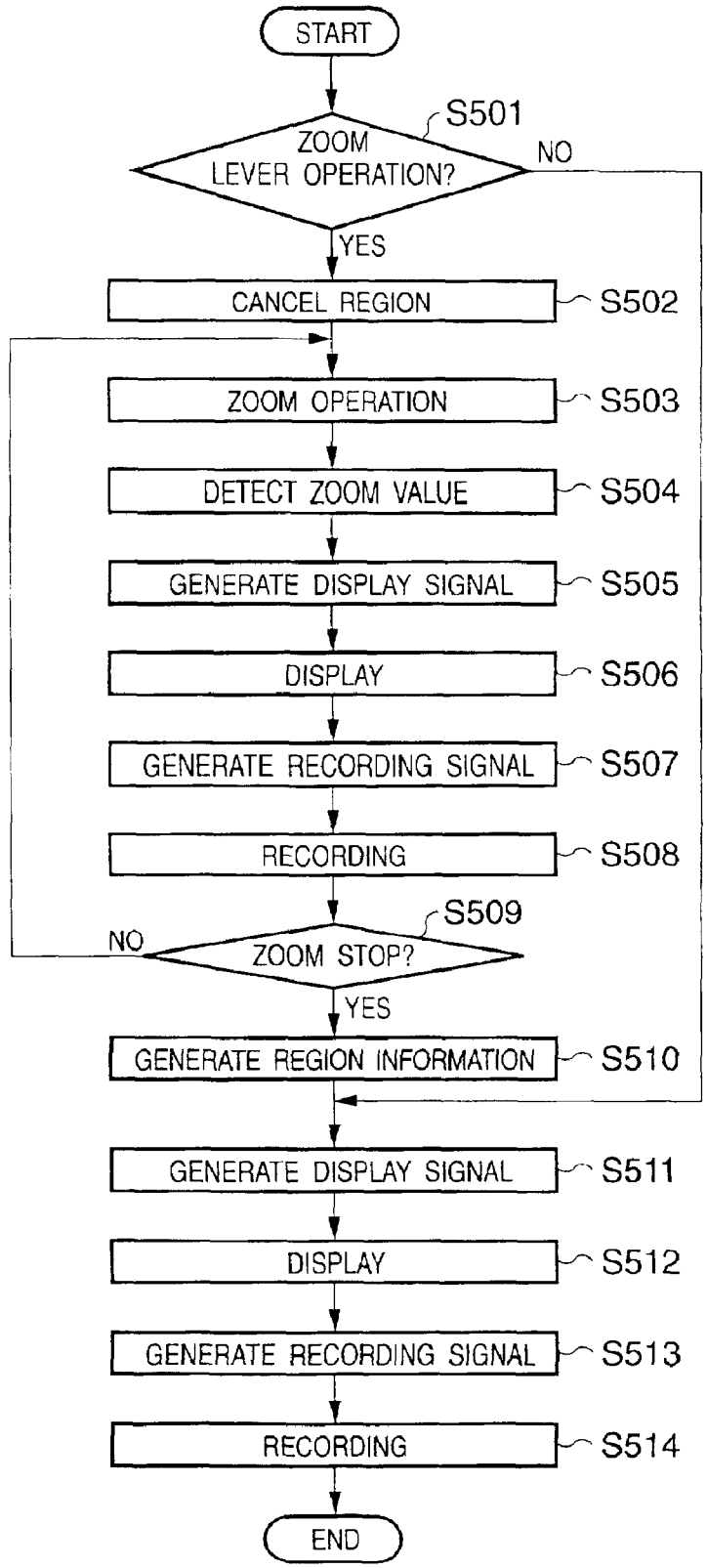
FIG. 29 is a flow chart showing a process executed upon zoom lever operation according to the fifth embodiment of the present invention.

FIG. 29 is a flow chart showing a process executed upon zoom lever operation according to the fifth embodiment of the present invention.

It is detected in step S501 if zoom lever operation is made. If no zoom lever operation is made (NO in step S501), the flow jumps to step S511 without changing region information. Since the processes in step S511 to S514 are the same as those in steps S310 to S313 in FIG. 23, a description thereof will be omitted.

On the other hand, if zoom lever operation is made (YES in step S501), the flow advances to step S502 to hold the zoom value before zoom lever operation, and to cancel the set region information before zoom lever operation. In step S503, the operation state of the zoom lever 25 is detected to drive the zoom lens 11, thus performing actual zoom operation. In step S504, the moving amount of the zoom lens 11 is detected by the zoom encoder 21 to compute a zoom value. In step S505, a display signal is generated using the entire sensed image as a non-designated region. In step S506, the generated display signal is displayed on the monitor 18. In step S507, the entire sensed image undergoes a coding process as a non-designated region to generate a recording signal. In step S508, the generated recording signal is recorded by the recording circuit 24.

In step S509, the operation state of the zoom lever 25 is detected to detect if zoom lever operation is at a stop. If zoom lever operation continues (NO in step S509), the flow returns to step S503 to continue actual zoom operation.

On the other hand, if it is determined in step S509 as a result of detection of the operation state of the zoom lever 25 that zoom lever operation is at a stop (YES in step S509), the flow advances to step S510. In step S510, the change amount of the zoom value by zoom lever operation is computed, and new region information is generated proportional to the change amount of the zoom value. In step S511, a display signal is generated by superposing the designated and non-designated regions on the basis of the generated region information. In step S512, the generated display signal is displayed on the monitor 18. In step S513, the designated and non-designated regions independently undergo a coding process on the basis of the generated region information to generate a recording signal. In step S514, the generated recording signal is recorded by the recording circuit 24, thus ending the process.

An example of a change in display state on the monitor 18 upon zoom lever operation according to the fifth embodiment will be described below using FIGS. 30A to 30C. Also, a change in designated region along with an elapse of time upon zoom lever operation in the fifth embodiment will be explained below using FIG. 31.

Figure 30A:
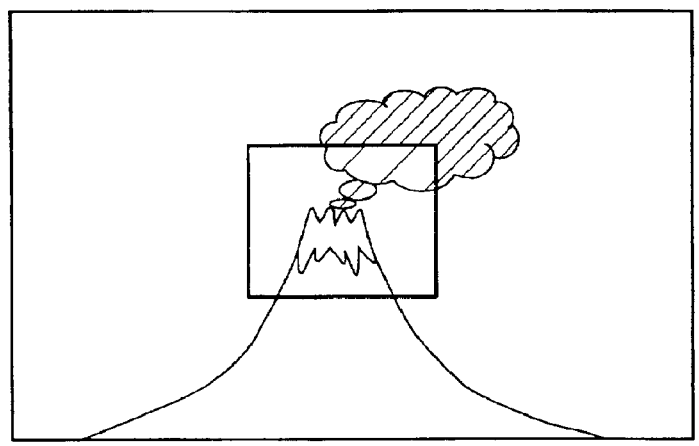
FIGS. 30A to 30C show an example of a change in display state on a monitor upon zoom lever operation according to the fifth embodiment of the present invention.
Figure 30B:
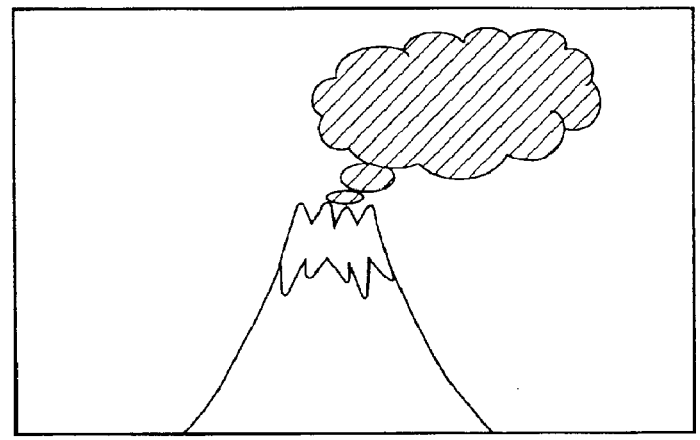
Figure 30C:
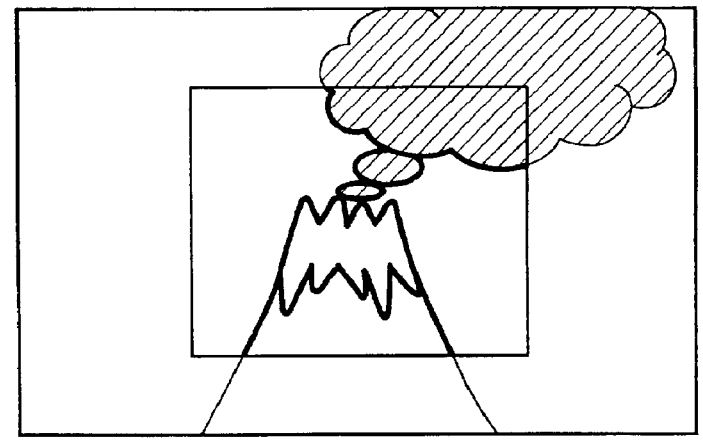
Figure 31:
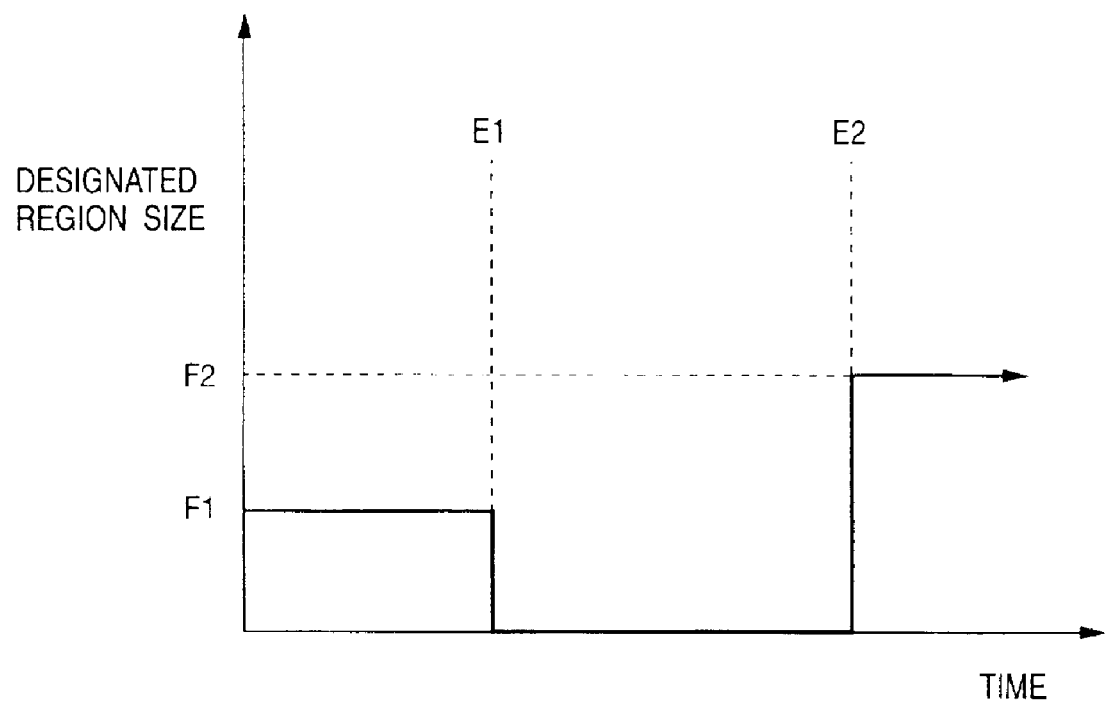
FIG. 31 is a graph showing the relationship between the time and designated region size according to the fifth embodiment of the present invention.

FIGS. 30A to 30C show an example of a change in display state on the monitor upon zoom lever operation according to the fifth embodiment of the present invention, and FIG. 31 is a graph showing the relationship between the time and designated region size in the fifth embodiment of the present invention.

FIGS. 30A to 30C show a change in state on the monitor 18 when zoom lever operation is made in the telephoto direction. Especially, FIG. 30A shows a display state before zoom lever operation, FIG. 30B shows a display state indicating a change in designated region (high image quality region) during zoom lever operation, and FIG. 30C shows a display state after zoom lever operation. In FIG. 31, the abscissa plots time, and the ordinate plots the size of the designated region. Also, E1 indicates the instruction timing of the zoom lever 25, E2 the instruction cancel timing of the zoom lever, F1 the size of the designated region before zoom lever operation, and F2 the size of the designated region after zoom lever operation.

As can be seen from FIGS. 30A to 30C and FIG. 31, the size of the designated region is set to be F1 before zoom lever operation. Upon receiving an enlargement instruction at the timing E1, the region information of the designated region is canceled. During zoom lever operation (from E1 to E2), the sensed image is enlarged in accordance with the zoom value. When the enlargement instruction is canceled at the timing E2, it is determined that zoom lever operation is complete, and new region information F2 is generated based on the zoom change amount before and after zoom lever operations, is set as the size of the designated region and is superposed on the sensed image.

As described above, according to the fifth embodiment, a designated region in an image can be encoded to have higher image quality than the remaining region. In addition, during zoom lever operation, the region information of the designated region is canceled, and the designated region can be automatically changed proportional to the change amount of the zoom value before and after zoom lever operation upon completion of zoom lever operation. Especially, when high-speed zoom operation is made, an image suffers radial blur due to exposure during zooming, and high-resolution information is highly likely to be lost at the time of image sensing. Hence, this embodiment is suitably used in such case.

To restate, according to the third to fifth embodiment, a change in high image quality region can be automatically controlled in accordance with the zoom speed, and the display and compression processes can be changed accordingly.

Note that the first to fifth embodiments have been independently explained. Alternatively, an image sensing apparatus may have operation obtained by arbitrarily combining operations explained in individual embodiments. In such case, by providing, to the image sensing apparatus, switching means such as a mode select switch or the like which is used to select operation described in each embodiment, the process to be executed can be changed for each object in accordance with user's favor.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the respective flow charts mentioned above.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus which senses an object image, and has a zoom function of enlarging/reducing a sensed image, comprising:

detection means for detecting a zoom speed of the zoom function;

display means for displaying the sensed image;

designation means for designating a desired partial region in the sensed image;

compression means for compressing a designated region designated by said designation means and a non-designated region using different characteristics; and control means for controlling the designated region on the basis of the zoom speed detected by said detection means.

2. The apparatus according to claim 1, wherein when the zoom speed detected by said detection means is less than a predetermined speed, said control means changes the designated region in synchronism with zoom operation by the zoom function.

3. The apparatus according to claim 1, wherein when the zoom speed detected by said detection means is not less than a predetermined speed, said control means changes the designated region after completion of zoom operation by the zoom function.

4. The apparatus according to claim 1, wherein when the zoom speed detected by said detection means is less than a predetermined speed, said control means changes the designated region in synchronism with zoom operation by the zoom function, and when the zoom speed detected by said detection means is not less than a predetermined speed, said control means changes the designated region after completion of the zoom operation.

5. The apparatus according to claim 1, wherein when the zoom speed detected by said detection means is not less than a predetermined speed, said control means cancels the designated region during zoom operation by the zoom function, and changes the designated region after completion of the zoom operation.

6. The apparatus according to claim 1, wherein said compression means compresses the designated region at a lower compression ratio than the non-designated region.

7. The apparatus according to claim 1, wherein said compression means includes discrete wavelet transformation.

8. The apparatus according to claim 1, wherein said display means displays the designated and non-designated regions distinct from each other.

9. A control method for an image sensing apparatus which senses an object image, and has a zoom function of enlarging/reducing a sensed image, comprising:
the detection step of detecting a zoom speed of the zoom function;
the display step of displaying the sensed image;
the designation step of designating a desired partial region in the sensed image;
the compression step of compressing a designated region designated in the designation step and a non-designated region using different characteristics; and
the control step of controlling the designated region on the basis of the zoom speed detected in the detection step.

10. The method according to claim 9, wherein the control step includes the step of changing, when the zoom speed detected in the detection step is less than a predetermined speed, the designated region in synchronism with zoom operation by the zoom function.

11. The method according to claim 9, wherein the control step includes the step of changing, when the zoom speed detected in the detection step is not less than a predetermined speed, the designated region after completion of zoom operation by the zoom function.

12. The method according to claim 9, wherein the control step includes the step of changing, when the zoom speed detected in the detection step is less than a predetermined speed, the designated region in synchronism with zoom operation by the zoom function, and changing, when the zoom speed detected in the detection step is not less than a predetermined speed, the designated region after completion of the zoom operation.

13. The method according to claim 9, wherein the control step includes the step of canceling, when the zoom speed detected in the detection step is not less than a predetermined speed, the designated region during zoom operation by the zoom function, and changing the designated region after completion of the zoom operation.

14. The method according to claim 9, wherein the compression step includes the step of compressing the designated region at a lower compression ratio than the non-designated region.

15. The method according to claim 9, wherein the compression step includes discrete wavelet transformation.

16. The method according to claim 9, wherein the display step includes the step of displaying the designated and non-designated regions distinct from each other.

17. A computer readable memory that stores a program code for controlling an image sensing apparatus which senses an object image, and has a zoom function of enlarging/reducing a sensed image, comprising:
a program code of the detection step of detecting a zoom speed of the zoom function;
a program code of the display step of displaying the sensed image;
a program code of the designation step of designating a desired partial region in the sensed image;
a program code of the compression step of compressing a designated region designated in the designation step and a non-designated region using different characteristics; and
a program code of the control step of controlling the designated region on the basis of the zoom speed detected in the detection step.

18. An image sensing apparatus which senses an object image, and has a zoom function of enlarging/reducing a sensed image, comprising:
operation means for executing enlargement/reduction zoom operation by the zoom function;
display means for displaying the sensed image;
designation means for designating a desired partial region in the sensed image;
compression means for compressing a designated region designated by said designation means and a non-designated region using different characteristics; and
control means for controlling the designated region on the basis of zoom operation by said operation means.

19. The apparatus according to claim 18, wherein said control means changes the designated region in accordance with zoom operation by said operation means.

20. The apparatus according to claim 18, wherein said control means inhibits the designated region from being changed during zoom operation by said operation means, and changes the designated region on the basis of operation contents of the zoom operation after completion of the zoom operation.

21. The apparatus according to claim 18, wherein said control means cancels region information that pertains to the designated region during zoom operation by said operation means, and changes the designated region on the basis of operation contents of the zoom operation after completion of the zoom operation.

22. The apparatus according to claim 18, wherein said compression means compresses the designated region at a lower compression ratio than the non-designated region.

23. The apparatus according to claim 18, wherein said compression means includes discrete wavelet transformation.

24. The apparatus according to claim 18, wherein said display means displays the designated and non-designated regions distinct from each other.

25. A control method for an image sensing apparatus which senses an object image, and has a zoom function of enlarging/reducing a sensed image, comprising:
the display step of displaying the sensed image;
the designation step of designating a desired partial region in the sensed image;
the compression step of compressing a designated region designated in the designation step and a non-designated region using different characteristics; and
the control step of controlling the designated region on the basis of enlargement/reduction zoom operation by the zoom function.

26. The method according to claim 25, wherein the control step includes the step of changing the designated region in accordance with the zoom operation.

27. The method according to claim 25, wherein the control step includes the step of inhibiting the designated region from being changed during the zoom operation, and changing the designated region on the basis of operation contents of the zoom operation after completion of the zoom operation.

28. The method according to claim 25, wherein the control step includes the step of canceling region information that pertains to the designated region during the zoom operation, and changing the designated region on the basis of operation contents of the zoom operation after completion of the zoom operation.

29. The method according to claim 25, wherein the compression step includes the step of compressing the designated region at a lower compression ratio than the non-designated region.

30. The method according to claim 25, wherein the compression step includes discrete wavelet transformation.

31. The method according to claim 25, wherein the display step includes the step of displaying the designated and non-designated regions distinct from each other.

32. A computer readable memory that stores a program code for controlling an image sensing apparatus which senses an object image, and has a zoom function of enlarging/reducing a sensed image, comprising:
- a program code of the display step of displaying the sensed image;
- a program code of the designation step of designating a desired partial region in the sensed image;
- a program code of the compression step of compressing a designated region designated in the designation step and a non-designated region using different characteristics; and
- a program code of the control step of controlling the designated region on the basis of enlargement/reduction zoom operation by the zoom function.

33. An image sensing apparatus which senses an object image, and has a zoom function of enlarging/reducing a sensed image, comprising:
- detection means for detecting a zoom speed of the zoom function;
- designation means for designating a desired partial region in the sensed image;
- compression means for compressing a designated region designated by said designation means and a non-designated region using different characteristics; and
- control means for controlling the designated region on the basis of the zoom speed detected by said detection means.

34. A control method for an image sensing apparatus which senses an object image, and has a zoom function of enlarging/reducing a sensed image, comprising:
- the detection step of detecting a zoom speed of the zoom function;
- the designation step of designated a desired partial region in the sensed image;
- the compression step of compressing a designated region designated in the designation step and a non-designated region using different characteristics; and
- the control step of controlling the designated region on the basis of the zoom speed detected in the detection step.

35. A computer readable memory that stores a program code for controlling an image sensing apparatus which senses an object image, and has a zoom function of enlarging/reducing a sensed image, comprising:
- a program code of the detection step of detecting a zoom speed of the zoon function;
- a program code of the designation step of designating a desired partial region in the sensed image;
- a program code of the compression step of compressing a designated region designated in the designation step and a non-designated region using different characteristics; and
- a program code of the control step of controlling the designated region on the basis of the zoom speed detected in the detection step.

36. An image sensing apparatus which senses an object image, and has a zoom function of enlarging/reducing a sensed image, comprising:
- operation means for executing enlargement/reduction zoom operation by the zoom function;
- designation means for designating a desired partial region in the sensed image;
- compression means for compressing a designated region designated by said designation means and a non-designated region using different characteristics; and
- control means for controlling the designated region on the basis of zoom operation by said operation by said operation means.

37. A control method for an image sensing apparatus which senses an object image, and has a zoom function of enlarging/reducing a sensed image, comprising:
- the designation step of designating a desired partial region in the sensed image;
- the compression step of compressing a designated region designated in the designation step and a non-designated region using different characteristics; and
- the control step of controlling the designated region on the basis of enlargement/reduction zoom operation by the zoom function.

38. A computer readable memory that stores a program code for controlling an image sensing apparatus which senses an object image, and has a zoom function of enlarging/reducing a sensed image, comprising:
- a program code of the designation step of designating a desired partial region in the sensed image;
- a program code of the compression step of compressing a designated region designated in the designation step and a non-designated region using different characteristics; and
- a program code of the control step of controlling the designated region on the basis of enlargement/reduction zoom operation by the zoom function.

* * * * *

UNITED STATES PATENT AND TRADEMARK OFFICE
CERTIFICATE OF CORRECTION

PATENT NO. : 7,012,641 B2  Page 1 of 1
APPLICATION NO. : 09/781255
DATED : March 14, 2006
INVENTOR(S) : Takeshi Kawabe It is certified that error appears in the above-identified patent and that said Letters Patent is hereby corrected as shown below:

IN THE DRAWINGS
Sheet 35, Fig. 33, "HORIZONAL" should read --HORIZONTAL--.

COLUMN 11
Line 49, "to-the" should read --to the--.

COLUMN 12
Line 2, "apparatus-will" should read --apparatus will--.

COLUMN 15
Line 26, "S104" should read --S104 to--.

COLUMN 18
Line 43, "apparatus-in" should read --apparatus in--.

COLUMN 19
Line 45, "elapse-of" should read --elapse of--.

COLUMN 27
Line 39, "designated" should read --designating--.
Line 51, "zoon" should read --zoom--.

COLUMN 28
Line 23, "by said operation by" should read --by--.

Signed and Sealed this

Fifteenth Day of August, 2006

JON W. DUDAS
*Director of the United States Patent and Trademark Office*